(12) United States Patent
Kim et al.

(10) Patent No.: US 11,399,685 B2
(45) Date of Patent: Aug. 2, 2022

(54) ARTIFICIAL INTELLIGENCE CLEANER AND METHOD OF OPERATING THE SAME

(71) Applicant: LG ELECTRONICS INC., Seoul (KR)

(72) Inventors: Suyeon Kim, Seoul (KR); Kamin Lee, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 16/491,118

(22) PCT Filed: Mar. 28, 2019

(86) PCT No.: PCT/KR2019/003636
§ 371 (c)(1),
(2) Date: Sep. 4, 2019

(87) PCT Pub. No.: WO2020/196962
PCT Pub. Date: Oct. 1, 2020

(65) Prior Publication Data
US 2021/0330163 A1 Oct. 28, 2021

(51) Int. Cl.
*A47L 11/40* (2006.01)
*G06T 7/579* (2017.01)
(Continued)

(52) U.S. Cl.
CPC ........ *A47L 11/4011* (2013.01); *G05D 1/0219* (2013.01); *G05D 1/0221* (2013.01);
(Continued)

(58) Field of Classification Search
CPC .. A47L 11/4011; A47L 2201/04; G06T 7/579; G05D 1/0221; G05D 1/0219; G05D 1/0274; G06N 3/02
See application file for complete search history.

(56) References Cited

U.S. PATENT DOCUMENTS 5,677,836 A * 10/1997 Bauer ................ G01S 13/89
701/26
6,393,370 B1 * 5/2002 Soika ................ G01S 7/52004
702/33
(Continued)

FOREIGN PATENT DOCUMENTS

KR 100664059 1/2007
KR 1020130030943 3/2013
(Continued)

OTHER PUBLICATIONS

PCT International Application No. PCT/KR2019/003636, Written Opinion of the International Searching Authority dated Dec. 12, 2019, 9 pages.

*Primary Examiner* — Bhavesh V Amin
(74) *Attorney, Agent, or Firm* — Lee Hong Degerman Kang Waimey

(57) ABSTRACT

Disclosed herein is an artificial intelligence cleaner. The artificial intelligence cleaner includes a memory configured to store a simultaneous localization and mapping (SLAM) map for a cleaning space; a driving unit configured to drive the artificial intelligence cleaner; and a processor configured to collect a plurality of cleaning logs for the cleaning space, divide the cleaning space into a plurality of cleaning areas using the SLAM map and the collected plurality of cleaning logs, determine a cleaning route of the artificial intelligence cleaner in consideration of the divided cleaning areas, and control the driving unit according to the determined cleaning route.

13 Claims, 21 Drawing Sheets

(51) Int. Cl.
*G05D 1/02* (2020.01)
*G06N 3/02* (2006.01)

(52) U.S. Cl.
CPC ............. *G05D 1/0274* (2013.01); *G06N 3/02* (2013.01); *G06T 7/579* (2017.01); *A47L 2201/04* (2013.01)

(56) References Cited

U.S. PATENT DOCUMENTS

| | | | | |
|---|---|---|---|---|
| 7,206,677 | B2* | 4/2007 | Hulden | G05D 1/0217 701/25 |
| 7,679,532 | B2* | 3/2010 | Karlsson | G05D 1/0272 340/988 |
| 7,805,220 | B2* | 9/2010 | Taylor | G05D 1/0219 318/568.17 |
| 8,463,436 | B2* | 6/2013 | Jeong | G05D 1/0274 700/253 |
| 8,798,840 | B2* | 8/2014 | Fong | G05D 1/0088 701/25 |
| 8,843,245 | B2* | 9/2014 | Choe | G05D 1/0274 700/214 |
| 8,849,559 | B2* | 9/2014 | Jeong | G06Q 19/003 701/411 |
| 8,918,241 | B2* | 12/2014 | Chen | G05D 1/0225 701/25 |
| 8,961,695 | B2* | 2/2015 | Romanov | A47L 11/4066 15/340.1 |
| 9,020,637 | B2* | 4/2015 | Schnittman | G05D 1/0227 382/106 |
| 9,239,580 | B2* | 1/2016 | Asahara | G05D 1/0274 |
| 9,250,081 | B2* | 2/2016 | Gutmann | G01C 21/12 |
| 9,286,810 | B2* | 3/2016 | Eade | G06F 16/444 |
| 9,304,001 | B2* | 4/2016 | Park | G05D 1/0231 |
| 9,440,354 | B2* | 9/2016 | Gutmann | G05D 1/0261 |
| 9,792,819 | B2* | 10/2017 | Neff | G08G 1/16 |
| 9,908,432 | B2* | 3/2018 | Park | B60G 17/019 |
| 9,946,263 | B2* | 4/2018 | Lindhé | G05D 1/0248 |
| 10,019,013 | B2* | 7/2018 | Kwak | A47L 9/2857 |
| 10,354,150 | B2* | 7/2019 | Yamazaki | H04N 13/254 |
| 10,463,212 | B2* | 11/2019 | Nam | A47L 9/30 |
| 10,766,132 | B2* | 9/2020 | Romanov | G05D 1/0219 |
| 11,076,734 | B2* | 8/2021 | Lee | A47L 9/2852 |
| 2005/0000543 | A1* | 1/2005 | Taylor | G05D 1/0274 134/18 |
| 2005/0010331 | A1* | 1/2005 | Taylor | G05D 1/0274 318/568.12 |
| 2005/0273967 | A1* | 12/2005 | Taylor | G05D 1/0246 15/319 |
| 2011/0202175 | A1* | 8/2011 | Romanov | A47L 11/4036 700/250 |
| 2011/0264305 | A1* | 10/2011 | Choe | G05D 1/0246 701/28 |
| 2013/0206177 | A1 | 8/2013 | Burlutskiy | |
| 2015/0012209 | A1 | 1/2015 | Park et al. | |
| 2015/0158174 | A1* | 6/2015 | Romanov | B25J 13/08 700/250 |
| 2016/0259336 | A1* | 9/2016 | Lee | B60G 17/016 |
| 2016/0313741 | A1 | 10/2016 | Lindhe et al. | |
| 2017/0102709 | A1* | 4/2017 | Kwak | A47L 9/009 |
| 2017/0332857 | A1* | 11/2017 | Nam | A47L 5/22 |
| 2018/0353042 | A1 | 12/2018 | Gil et al. | |
| 2019/0090711 | A1* | 3/2019 | Lee | A47L 9/2852 |
| 2021/0053207 | A1* | 2/2021 | Romanov | A47L 11/4066 |

FOREIGN PATENT DOCUMENTS

| | | |
|---|---|---|
| KR | 1020130091879 | 8/2013 |
| KR | 1020150004568 | 1/2015 |
| KR | 1020180134230 | 12/2018 |

\* cited by examiner

FIG. 11

| FIRST CONDITION | SECOND CONDITION | THIRD CONDITION | FOURTH CONDITION | AREA TYPE |
|---|---|---|---|---|
| RESTRAINT RATIO ≥ $th_1$ | - | - | - | RESTRAINT AREA |
| RESTRAINT RATIO < $th_1$ | OBSTACLE RATIO ≥ $th_2$ | - | - | OBSTACLE AREA |
| | OBSTACLE RATIO < $th_2$ | AVERAGE CLEANING TIME ≥ $th_3$ | - | COMPLICATED AREA |
| | | AVERAGE CLEANING TIME < $th_3$ | AVERAGE NUMBER OF TIMES OF CLEANING ≥ $th_4$ | PASSAGE AREA |
| | | | AVERAGE NUMBER OF TIMES OF CLEANING < $th_4$ | NORMAL CLEANING AREA |

ARTIFICIAL INTELLIGENCE CLEANER AND METHOD OF OPERATING THE SAME

CROSS-REFERENCE TO RELATED APPLICATIONS

This application is the National Stage filing under 35 U.S.C. 371 of International Application No. PCT/KR2019/003636, filed on Mar. 28, 2019, the contents of which are hereby incorporated by reference herein in its entirety.

BACKGROUND OF THE INVENTION

1. Field of the Invention

The present invention relates to an artificial intelligence cleaner and a method of operating the same. In particular, the present invention relates to an artificial intelligence cleaner that identifies areas lowering cleaning efficiency using cleaning data and resets a cleaning route or a cleaning mode in the cleaning route using area identification information.

2. Discussion of the Related Art

A robot cleaner is a device that automatically performs cleaning by suctioning foreign substances such as dust from a floor surface while driving by itself in an area to be cleaned without a user's operation. The robot cleaner is configured to set a cleaning route according to a built-in program and perform a cleaning operation while driving along the set cleaning route.

In general, the robot cleaner performs cleaning while avoiding obstacles when there are obstacles in consideration of only environment of a predetermined radius (for example, a radius of 25 feet) around the cleaner rather than an entire cleaning area. Therefore, the robot cleaner sometimes wanders in a previously wandering area, such as an area that the robot cleaner takes a long time to clean or repeatedly hits an obstacle. For example, in an area with a lot of obstacles, cleaning may take a long time or may be restricted due to movement restrictions. In addition, certain areas may be cleaned more than others.

Thus, when a cleaning route or a cleaning mode suitable for a given cleaning zone is set, cleaning will be more efficient.

PRIOR ART

Patent Document 1
Korean Registered Patent No. 10-0664059

SUMMARY OF THE INVENTION

An object of the present invention is to provide an artificial intelligence cleaner and a method of operating the same, which classify a space that is difficult to be cleaned and a space that is easy to be cleaned and perform cleaning based on cleaning logs of the artificial intelligence cleaner.

In addition, another object of the present invention is to provide an artificial intelligence cleaner and a method of operating the same, which set a cleaning mode and a cleaning order of each cleaning area in consideration of characteristics of the area and perform cleaning according to a cleaning route considering the cleaning mode and the cleaning order that are set.

An artificial intelligence cleaner according to an embodiment of the present invention may divide a cleaning space into a plurality of cleaning areas using a plurality of cleaning logs, set a cleaning route considering the cleaning areas, and perform cleaning according to the set cleaning route.

In addition, the artificial intelligence cleaner according to the embodiment of the present invention may classify the cleaning areas into area types and set a cleaning route in consideration of cleaning modes for the area types and cleaning priorities between the area types.

According to the various embodiments of the present invention, it is possible to perform cleaning suitably to the shape or characteristics of a space by dividing a cleaning space into a plurality of cleaning areas, and determining a cleaning route based on the cleaning areas.

In addition, according to the various embodiments of the present invention, the cleaning mode is set for each area type and the cleaning priority for each of the area types is set, thereby providing a cleaning mode suitable for the characteristics of each space and cleaning may be performed from an area having high priority, thereby increasing the satisfaction of cleaning and lowering the probability of cleaning failure.

BRIEF DESCRIPTION OF THE DRAWINGS

FIG. 11 is a view illustrating an example of a rule-based cleaning area division model according to an embodiment of the present invention.

DETAILED DESCRIPTION OF THE PREFERRED EMBODIMENTS

Figure 1:
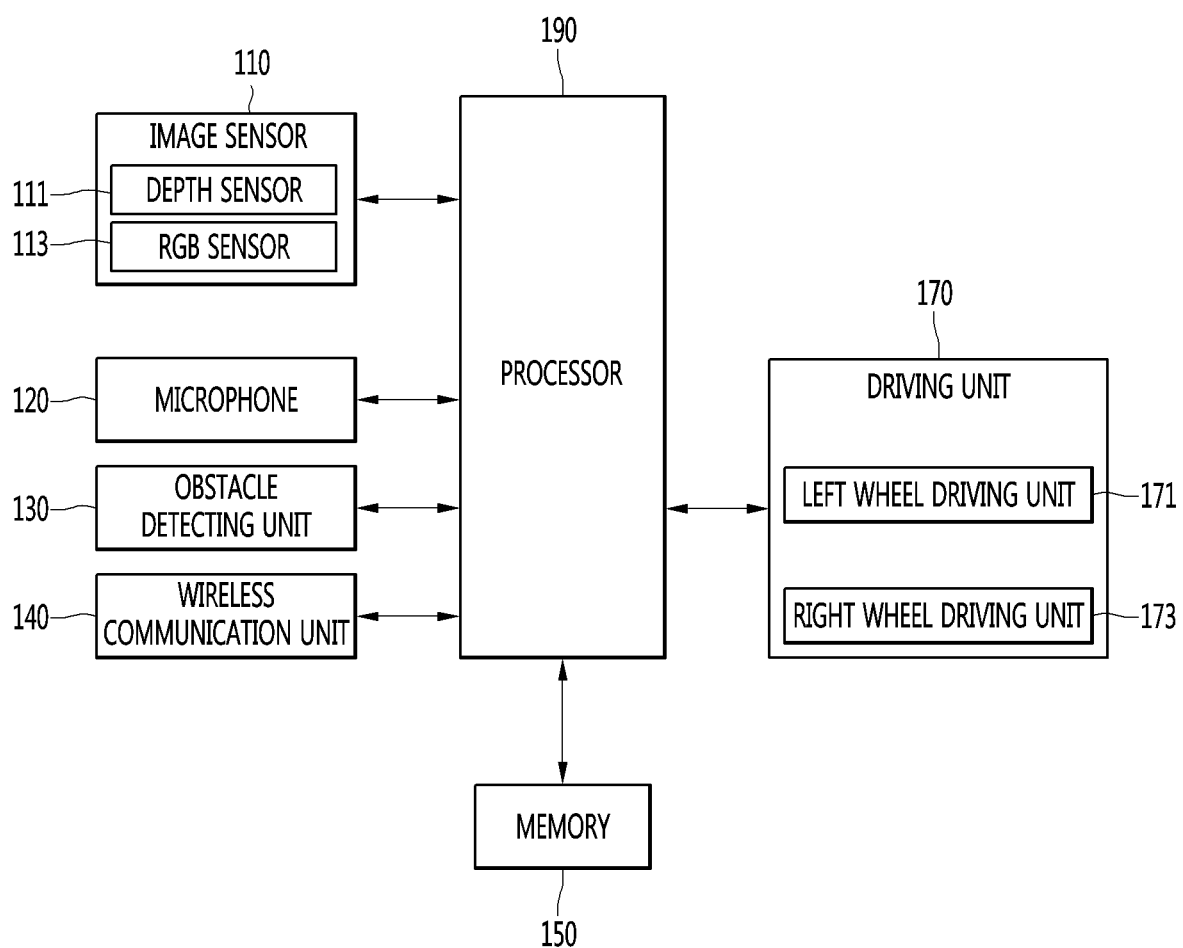
FIG. 1 is a block diagram illustrating a configuration of an artificial intelligence cleaner according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering". Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of an artificial intelligence cleaner 100 according to an embodiment of the present invention.

Referring to FIG. 1, an artificial intelligence cleaner 100 according to an embodiment of the present invention may include an image sensor 110, a microphone 120, an obstacle detector 130, a wireless communication unit 140, a memory 150, and driving unit 170, and a processor 190.

Hereinafter, the artificial intelligence cleaner 100 may be referred to as a terminal 100.

The image sensor 110 may obtain image data of the surroundings of the artificial intelligence cleaner 100.

The image sensor 110 may include one or more of a depth sensor 111 or an RGB sensor 113.

The depth sensor 111 may detect that light emitted from a light emitting unit (not shown) is reflected by the object and returned. The depth sensor 111 may measure a distance to an object based on a time difference between the light and the returned light, an amount of the returned light, and the like.

The depth sensor 111 may obtain 2D image information or 3D image information associated with the surroundings of the cleaner 100 based on the measured distance to the object.

The RGB sensor 113 may obtain color image information associated with an object around the cleaner 100. The color image information may be a captured image of the object. The RGB sensor 113 may be referred to as an RGB camera.

The microphone 120 may receive speech of a user. Intention information of the received speech of the user may be analyzed through a speech server (not shown).

Here, the speech of the user may be a speech for controlling the artificial intelligence cleaner 100.

The obstacle detector 130 may include an ultrasonic sensor, an infrared sensor, a laser sensor, and the like. For example, the obstacle detector 130 may project laser light toward a cleaning area and extract a pattern of the reflected laser light.

The obstacle detector 130 may detect an obstacle based on the extracted position and pattern of the laser light.

When the depth sensor 110 is used to detect an obstacle, the configuration of the obstacle detector 130 may be omitted.

The wireless communication unit 140 may include at least one of a wireless Internet module and a short range communication module.

The mobile communication module may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module refers to a module for wireless internet access and may be built in or external to the mobile terminal 100. The wireless Internet module may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The memory 150 may store a simultaneous location estimation and mapping (SLAM) map created through a SLAM algorithm.

A movement detection sensor 160 may detect movement of the artificial intelligence cleaner 100. Specifically, the movement detection sensor 160 may detect that the artificial intelligence cleaner 100 is lifted and moved by the user.

The movement detection sensor 160 may include one or more of a floor detection sensor 161 and a gyro sensor 163.

The floor detection sensor 161 may detect whether the artificial intelligence cleaner 100 is moved by the user by using infrared rays. Detailed description thereof will be described later.

The gyro sensor 163 may measure an angular velocity of the artificial intelligence cleaner 100 for each of the x-axis, the y-axis, and the z-axis. The gyro sensor 163 may detect the movement of the artificial intelligence cleaner 100 by the user using a change amount in the angular velocity for each axis.

In addition, the movement detection sensor 160 may include a wheel sensor, a cliff sensor, and the like, and may detect movement of the artificial intelligence cleaner 100 by the user using the sensor.

The driving unit 170 may move the artificial intelligence cleaner 100 in a specific direction or by a specific distance.

The driving unit 170 may include a left wheel driving unit 171 for driving the left wheel of the artificial intelligence cleaner 100 and a right wheel driving unit 173 for driving the right wheel.

The left wheel driving unit 171 may include a motor for driving the left wheel, and the right wheel driving unit 173 may include a motor for driving the right wheel.

Although the driving unit 170 is described as including the left wheel driving unit 171 and the right wheel driving unit 173 as an example in FIG. 1, the driving unit 170 is not limited thereto, and a single driving unit may be provided when there is a single wheel.

The processor 190 may control overall operation of the artificial intelligence cleaner 100.

Figure 2:
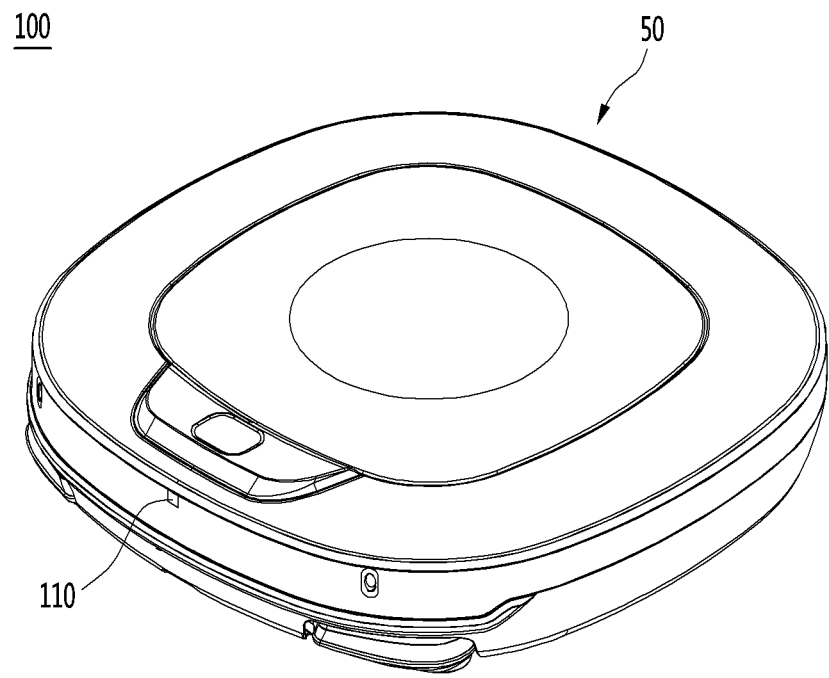
FIG. 2 is a perspective view of the artificial intelligence cleaner according to an embodiment of the present invention.

FIG. 2 is a perspective view of the artificial intelligence cleaner 100 according to an embodiment of the present invention.

Referring to FIG. 2, the artificial intelligence cleaner 100 may include a cleaner body 50 and an image sensor 110 provided on an upper surface of the cleaner body 50.

The image sensor 110 may project light toward the front and receive the reflected light.

The image sensor 110 may obtain depth information by using a time difference between the light and the returned light.

The cleaner body 50 may include other components except the image sensor 110 among the components described with reference to FIG. 1.

Figure 3:
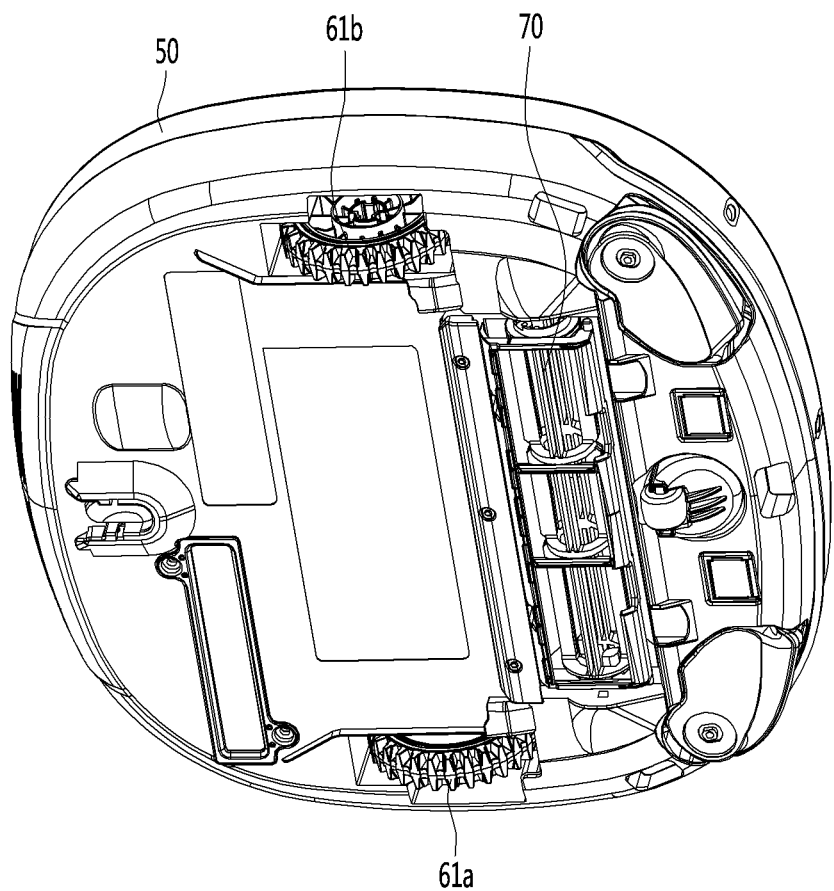
FIG. 3 is a bottom view of the artificial intelligence cleaner according to an embodiment of the present invention.

FIG. 3 is a bottom view of the artificial intelligence cleaner 100 according to an embodiment of the present invention.

Referring to FIG. 3, the artificial intelligence cleaner 100 may further include a cleaner body 50, a left wheel 61a, a right wheel 61b, and a suction unit 70 in addition to the configuration of FIG. 1.

The left wheel 61a and the right wheel 61b may drive the cleaner body 50.

A left wheel driving unit 171 may drive the left wheel 61a, and a right wheel driving unit 173 may drive the right wheel 61b.

As the left wheel 61a and the right wheel 61b are rotated by the driving unit 170, the artificial intelligence cleaner 100 may suction foreign substances such as dust or garbage through the suction unit 70.

The suction unit 70 may be provided in the cleaner body 50 to suction dust from a floor surface.

The suction unit 70 may further include a filter (not shown) that collects foreign matters from the suctioned airflow, and a foreign matter receiver (not shown) in which foreign matters collected by the filter are accumulated.

Figure 4:
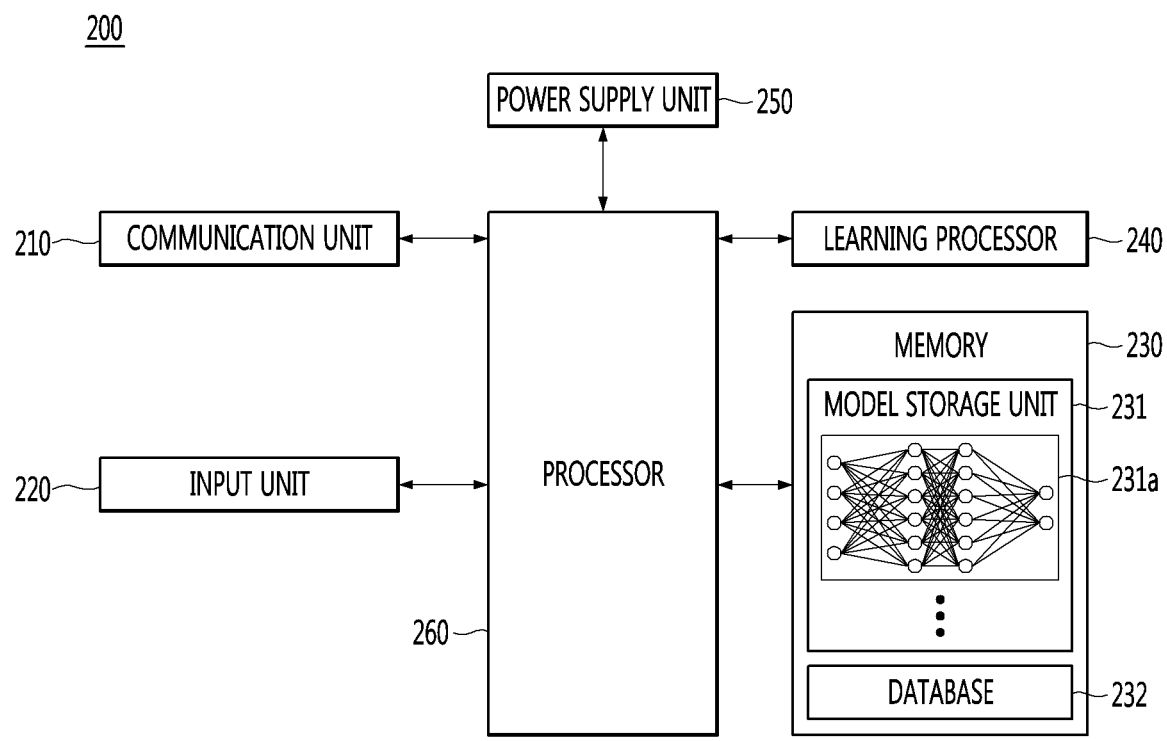
FIG. 4 is a block diagram illustrating a configuration of a learning device of an artificial neural network according to an embodiment of the present invention.

FIG. 4 is a block diagram illustrating a configuration of a learning device 200 of an artificial neural network according to an embodiment of the present invention.

The learning device 200 is a device or a server separately provided outside the artificial intelligence cleaner 100 and may be configured to receive, classify, store, and output information to be used for data mining, data analysis, intelligent decision making, and a machine learning algorithm. Here, the machine learning algorithm may include a deep learning algorithm.

The learning device 200 may communicate with at least one artificial intelligence cleaner 100, and may derive a result by analyzing or training data for assistance to or on behalf of the artificial intelligence cleaner 100. Here, the assistance to another apparatus may mean distribution of computation through distributed processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model trained by machine learning or deep learning to the artificial intelligence cleaner 100 periodically or at a request.

Alternatively, the learning device 200 may store the trained model and transmit a result value derived by using the trained model to the artificial intelligence cleaner 100 when there is a request from the artificial intelligence cleaner.

Referring to FIG. 4, the learning device 200 may include a communication unit 210, an input unit 220, a memory 230, a learning processor 240, a power supply unit 250, a processor 260, and the like.

The communication unit 210 may correspond to the wireless communication unit 140 of FIG. 1.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 stores a model learned through a machine learning algorithm or a deep learning algorithm, training data, input data or the like.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 4 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the training data (or the training data) used for the model learning, a learning history of the model, and the like.

The database 232 stored in the memory 232 may be input data itself, which is not processed, as well as data that is processed adequate for the model learning.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

In this case, the trained model may infer a result value in the state of being mounted in the learning device 200 of an artificial neural network, or may be transmitted and mounted to another device such as the artificial intelligence cleaner 100 through the communication unit 210.

In addition, when the trained model is updated, the updated trained model may be transmitted to and mounted on another device such as the terminal 100 through the communication unit 210.

The power supply unit 250 supplies power.

Duplicated description with respect to the constituents corresponding to each other will be omitted.

Figure 5:
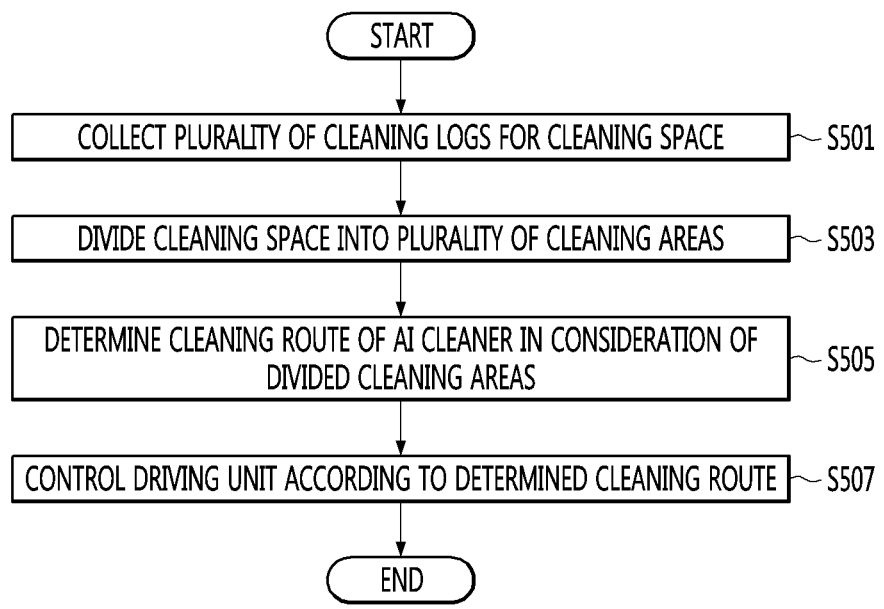
FIG. 5 is a flowchart of a method for operating an artificial intelligence cleaner according to an embodiment of the present invention.

FIG. 5 is a flowchart for describing a method for operating an artificial intelligence cleaner according to an embodiment of the present invention.

Referring to FIG. 5, the processor 190 of the artificial intelligence cleaner 100 according to an embodiment of the present invention collects a plurality of cleaning logs for a cleaning space (S501).

The processor 190 may generate cleaning logs through information collected from various sensors provided in the artificial intelligence cleaner 100.

Here, various sensors may include an RGB camera, an RGB-D camera, a cliff sensor, and the like.

Each cleaning log may include at least one or more of a required cleaning time, whether cleaning is performed, a cleaning result value, the number of times of cleaning, whether an obstacle is detected, or whether restraint occurs, with respect to each cleaning unit in the cleaning space.

The cleaning unit may mean a unit obtained by dividing a cleaning space, and the size thereof may be a preset default value. For example, the cleaning unit may have a size of 5 cm×5 cm.

The required cleaning time may mean a time for which the artificial intelligence cleaner 100 stays in a specific cleaning unit.

For example, since the artificial intelligence cleaner 100 may easily perform cleaning in a space without an obstacle, the required cleaning time may be small. On the other hand, in a space with a lot of obstacles, the artificial intelligence cleaner 100 may perform operations such as a direction change operation, and thus the required cleaning time may be large.

Whether cleaning is performed may mean whether the artificial intelligence cleaner 100 has arrived or stayed in a specific cleaning unit.

Here, whether cleaning is performed may indicate only whether the required cleaning time is 0 or not, and in this case, whether cleaning is performed may be understood as a subordinate concept of the required cleaning time.

The cleaning result value may indicate an amount of foreign matter/dust obtained through the sensors in a specific cleaning unit or may indicate a reduction amount of foreign matter/dust due to cleaning.

For example, the cleaning result value may be good in a space where the artificial intelligence cleaner 100 is easy to reach because there is no obstacle, and the cleaning result value may be bad in a space where the artificial intelligence cleaner 100 is difficult to reach due to a lot of obstacles.

The number of times of cleaning may mean how many times the artificial intelligence cleaner 100 has arrived or stayed in a specific cleaning unit.

For example, since the artificial intelligence cleaner 100 is unlikely to repeatedly clean the central portion of a room, the number of times of cleaning may be low. On the other hand, since the artificial intelligence cleaner 100 is likely to repeatedly clean a passage connecting two rooms as it reciprocates the two rooms, the number of times of cleaning may be high.

Whether the obstacle is detected may mean whether the artificial intelligence cleaner 100 detects the obstacle in a specific cleaning unit.

In addition, whether the obstacle is detected may indicate not only whether there is an obstacle but also whether it is a threshold and whether there is a height difference.

For example, when the obstacle is detected, a value thereof may be determined as 1, and when the obstacle is not detected, the value thereof may be determined as 0.

Whether restraint occurs may mean whether the artificial intelligence cleaner 100 is not able to be driven any further due to a certain factor in a specific cleaning unit.

Alternatively, whether restraint occurs may mean whether the artificial intelligence cleaner 100 is not able to escape from a plurality of adjacent specific cleaning units. In this case, the plurality of adjacent specific cleaning units is a relatively small space compared to the entire cleaning space.

For example, the artificial intelligence cleaner 100 may be determined to be constrained when it cannot move by being caught on a wire or when it cannot move back out of a bed after moving under the bed, and a value thereof may be determined as 1.

Each cleaning log may be collected based on the SLAM map of the cleaning space.

When coordinates are set for the inside of the cleaning space through the SLAM map for the cleaning space, information collected from the sensors may be stored in the cleaning log along with the coordinates of the inside of the cleaning space.

That is, the cleaning log may include coordinate information in the SLAM map for the cleaning space.

When the size of a cleaning unit, which is a reference for the cleaning log, is different from a default value, the cleaning log may further include size information of the cleaning unit.

For example, when the default value of the cleaning unit is 5 cm×5 cm but a specific cleaning log is collected for a cleaning unit of 10 cm×10 cm, the specific cleaning log may include size information of 10 cm×10 cm as the size information of the cleaning unit.

The processor 190 divides the cleaning space into a plurality of cleaning areas by using the collected plurality of cleaning logs (S503).

The reason why the processor uses the plurality of cleaning logs when dividing the cleaning space into a plurality of cleaning areas is to prevent the cleaning areas from being distorted due to a temporary obstacle, such as a user or a temporarily-placed object.

That is, by using a frequency, an average, a lowest value, a median, and the like of each item collected for the plurality of cleaning logs, the plurality of cleaning areas may be distinguished from one another without being distorted even by the temporary state change of the cleaning space.

Each cleaning area may be classified into one of a plurality of predetermined area types. Here, the area types include a basic cleaning area, and may further include at least one of an obstacle area, a restraint area, a complicated area, or a passage area.

For example, the cleaning space may be divided into an area with no obstacle and an area with many obstacles. The area with no obstacle may be classified into the basic cleaning area, and the area with many obstacles may be classified into the obstacle area. In addition, an area that takes a long time to be cleaned due to an obstacle or a structure of a space may be classified into a complicated area.

In addition, each divided cleaning area may be subjected to division not to include sub cleaning areas which are not connected to each other. This means that the divided cleaning areas are continuous areas.

When there are a plurality of areas that are classified into the same area type but not adjacent or connected to each other, the plurality of areas may be separated from each other and classified into respective cleaning areas.

A detailed description of a method of dividing the cleaning space into a plurality of cleaning areas will be given later.

The processor 190 determines a cleaning route of the artificial intelligence cleaner 100 in consideration of the divided cleaning areas (S505).

The processor 190 may set different cleaning modes for the divided cleaning areas.

The cleaning modes may include a normal cleaning mode, a simple cleaning mode, and a non-cleaning mode.

Furthermore, the cleaning mode may further include a strong cleaning mode (or a meticulous cleaning mode).

For example, the cleaning area classified into a normal cleaning area may be cleaned in the normal cleaning mode, and the cleaning area classified into the obstacle area may be cleaned in the simple cleaning mode.

The processor 190 may determine a cleaning route corresponding to each cleaning mode.

For example, the processor 190 may set the interval between cleaning routes in the simple cleaning mode to be wider than the interval between cleaning routes in the normal cleaning mode. Similarly, the processor 190 may set the interval between cleaning routes in the strong cleaning mode to be narrower than the interval between cleaning routes in the normal cleaning mode.

In addition, the processor 190 may determine the number of times of cleaning for the same place according to the cleaning mode.

For example, the processor 190 determines the cleaning route to perform at least one cleaning operation on one place in the simple cleaning mode, determines the cleaning route to perform at least two times of cleaning on one place in the normal cleaning mode, and determines the cleaning route to perform at least three times of cleaning on one place in the strong cleaning mode.

The processor 190 may determine the cleaning route according to the cleaning priorities between divided cleaning spaces.

For example, the processor 190 may determine a cleaning route such that the cleaning space of the first priority is first cleaned and the cleaning space of the next priority is later cleaned.

The processor 190 controls the driving unit 170 of the artificial intelligence cleaner 100 according to the determined cleaning route (S507).

The determined cleaning route may be stored in the memory 150, and the processor 190 may control the driving unit 170 such that the artificial intelligence cleaner 100 moves along the cleaning route.

Accordingly, the artificial intelligence cleaner 100 divides the cleaning space into a plurality of cleaning areas, and cleans the cleaning areas along a cleaning route considering the types of the cleaning areas, thereby reducing the time required for cleaning and effectively preventing interruption of cleaning.

Figure 6:
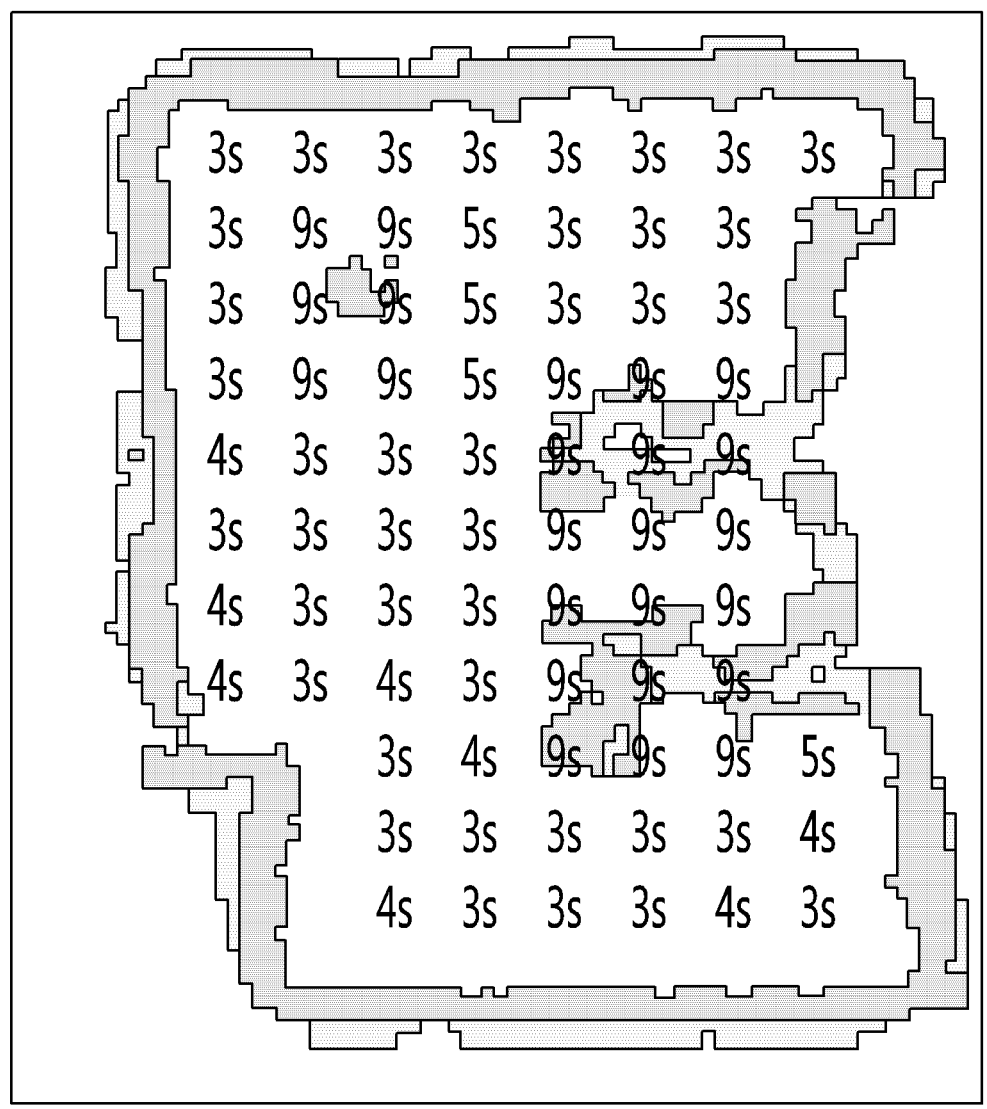
FIG. 6 is a view illustrating an example of cleaning logs according to an embodiment of the present invention.

FIG. 6 is a view illustrating an example of a cleaning log according to an embodiment of the present invention.

Specifically, FIG. 6 shows the required cleaning time for each cleaning unit, which is collected, together with the SLAM map.

The cleaning log may include the required cleaning time for each cleaning unit, and the required cleaning time for each cleaning unit may be recorded together with the coordinates of the SLAM map of the cleaning space. For example, the cleaning log may include information on the required cleaning time in the form of (coordinates, required cleaning time).

The artificial intelligence cleaner 100 may provide a user terminal device with image information indicating the SLAM map and a required cleaning time for each cleaning unit on the SLAM map as shown in FIG. 6.

Figure 7:
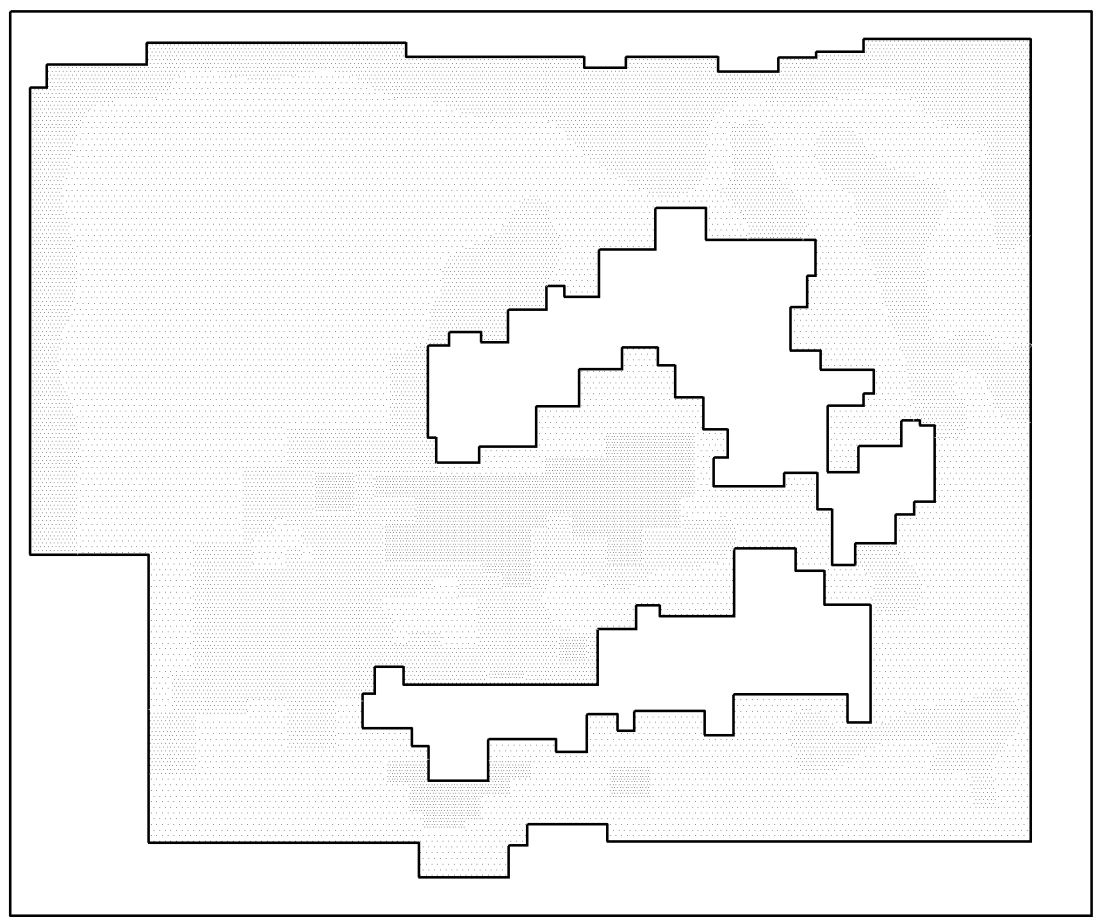
FIG. 7 is a view illustrating an example of a cleaning log according to an embodiment of the present invention.

FIG. 7 is a view illustrating an example of a cleaning log according to an embodiment of the present invention.

Specifically, FIG. 7 shows a heat map reflecting the number of times of cleaning and the required cleaning time for the SLAM map in the cleaning space.

The artificial intelligence cleaner 100 may provide the heat map for the SLAM map as shown in FIG. 7 to the user terminal device.

Figure 8:
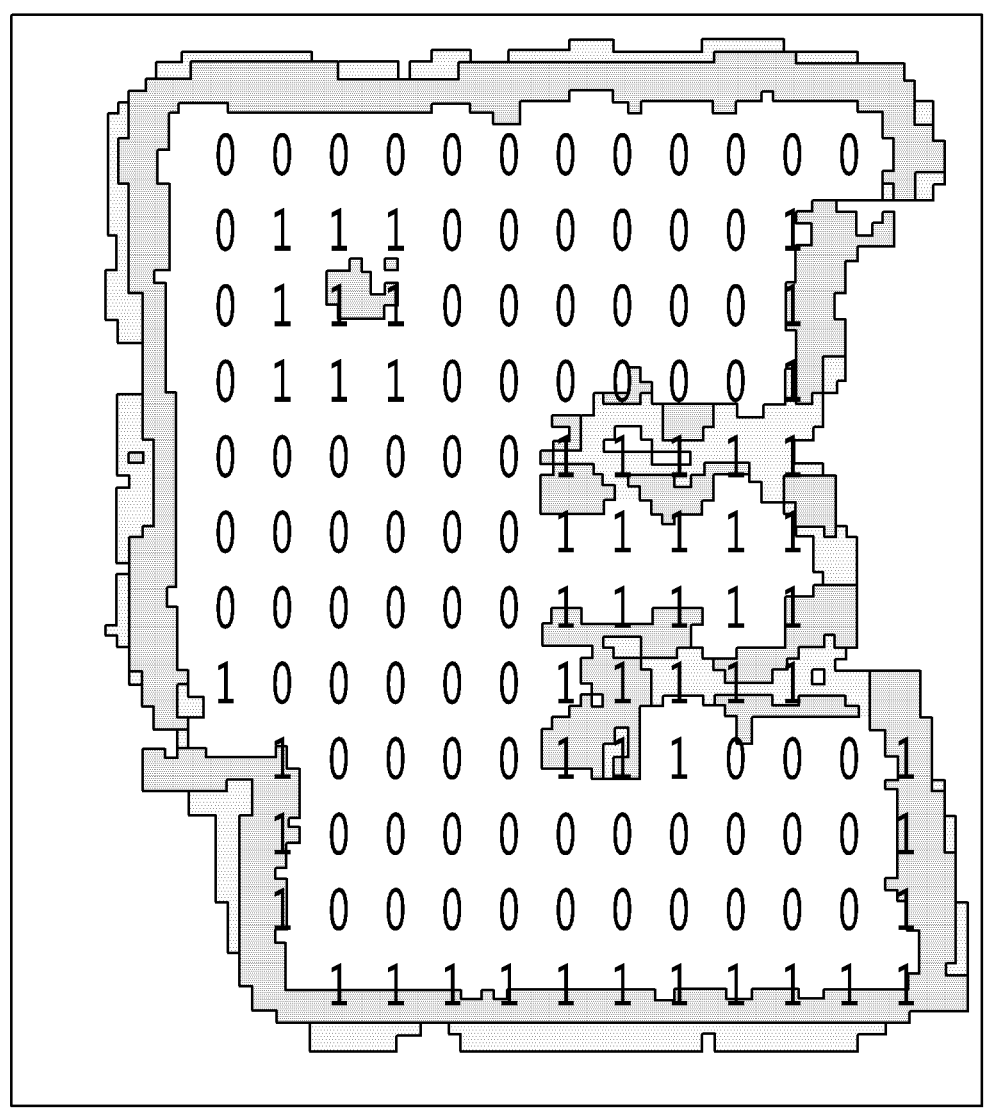
FIG. 8 is a view illustrating an example of a cleaning log according to an embodiment of the present invention.

FIG. 8 is a view illustrating an example of a cleaning log according to an embodiment of the present invention.

Specifically, FIG. 8 shows whether cleaning is performed or a cleaning result value for each cleaning unit cleaning, which are collected together with the SLAM map.

Whether cleaning is performed on a specific cleaning unit may mean whether the artificial intelligence cleaner 100 has reached or stayed in the specific cleaning unit for cleaning. Alternatively, whether cleaning is performed may mean whether cleaning is necessary.

As described above, the cleaning result value may mean an amount or a change amount of foreign matter/dust collected through the sensor.

Alternatively, the cleaning result value may mean a value indicating whether cleaning is sufficiently performed according to whether the amount of foreign matter/dust collected through the sensor is below a reference value.

For example, when the amount of foreign matter/dust is below the reference value, cleaning is sufficiently performed. Therefore, a value related to whether cleaning is performed or the cleaning result value is set to 0. When the amount of foreign matter/dust exceeds the reference value, the value related to whether cleaning is performed or the cleaning result value is set to 1 to mean that cleaning is necessary.

The cleaning log may include whether cleaning is performed or a cleaning result value for each cleaning unit. Whether cleaning is performed or the cleaning result value for each cleaning unit may be recorded together with the coordinates of the SLAM map of the cleaning space. For example, the cleaning log may include information on the required cleaning time in the form of (coordinates, whether cleaning is performed), (coordinates, cleaning result value) or (coordinates, whether cleaning is performed, and cleaning result value).

The cleaning log may include the required cleaning time for each cleaning unit, and the required cleaning time for each cleaning unit may be recorded together with the coordinates of the SLAM map of the cleaning space. For example, the cleaning log may include information on the required cleaning time in the form of (coordinates, required cleaning time).

The artificial intelligence cleaner 100 may provide the user terminal device with image information indicating the SLAM map and whether cleaning is performed or the cleaning result value for each cleaning unit on the SLAM map as shown in FIG. 8.

Figure 9:
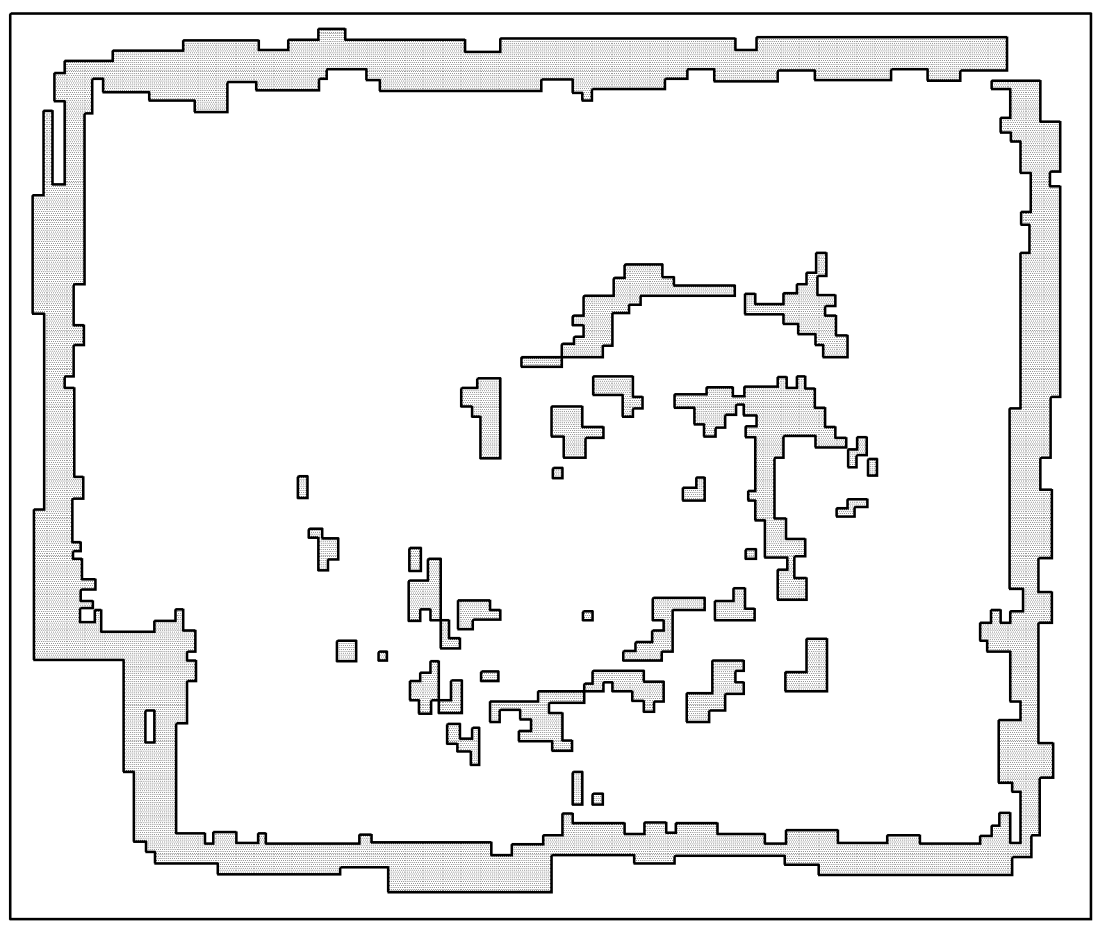
FIG. 9 is a view illustrating an example of a cleaning log according to an embodiment of the present invention.

FIG. 9 is a view illustrating an example of a cleaning log according to an embodiment of the present invention.

Specifically, FIG. 9 illustrates a SLAM map reflecting whether cleaning is performed or a cleaning result value in a cleaning space.

The artificial intelligence cleaner 100 may provide a SLAM map as shown in FIG. 9 to the user terminal device.

Figure 10:
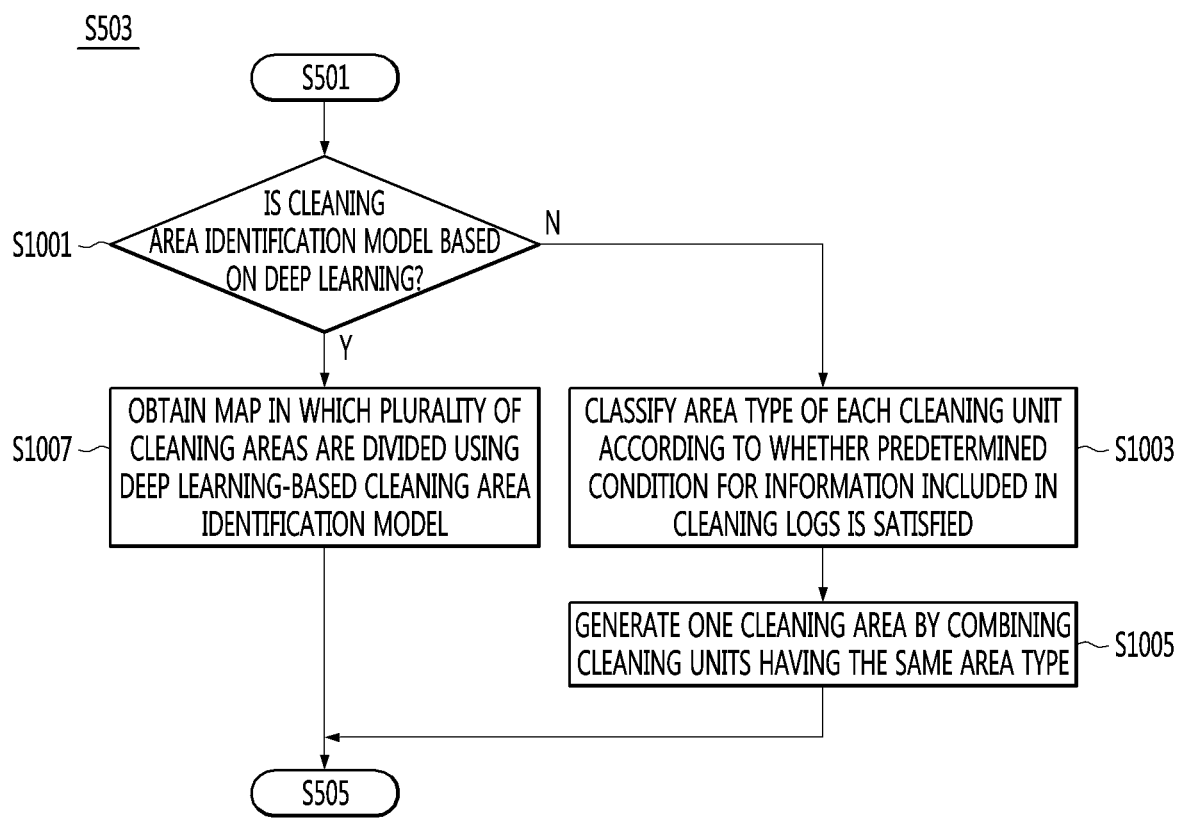
FIG. 10 is a flowchart illustrating an example of a step (S503) of dividing a cleaning space illustrated in FIG. 5 into a plurality of cleaning areas.

FIG. 10 is a flowchart illustrating an example of a step (S503) of dividing a cleaning space illustrated in FIG. 5 into a plurality of cleaning areas.

Referring to FIG. 10, the processor 190 determines whether a cleaning area division model is a deep learning-based model (S1001).

The model for dividing the cleaning area may be a deep learning-(or machine learning-) based model or a rule-based model.

The deep learning (or machine learning)-based model may mean an artificial neural network learned by a deep learning (or machine learning) algorithm.

The rule-based model may mean a model consisting of conditions for various variables.

Here, the rule-based model may refer only to conditions for various variables, but may also refer to the entire process of classifying the cleaning areas using these conditions.

The cleaning area division model may be stored in the memory 150.

The processor 190 may determine whether the cleaning area division model is a deep learning-based model or a rule-based model according to a preset value or a user's selection.

If only one type of cleaning area division model is mounted in the memory 150, the processor 190 may classify the cleaning area using the mounted cleaning area division model without a separate determination process.

If the cleaning area division model is not a deep learning-based model as a result of the determination in step S1001, the processor 190 classifies the cleaning areas according to the rule-based model.

Specifically, the processor 190 classifies an area type of each cleaning unit according to whether a preset condition for information included in the cleaning logs is satisfied (S1003).

The processor 190 generates one cleaning area by combines the cleaning units having the same area type (S1005).

Here, the processor 190 may combine adjacent (or connected) cleaning units having the same area type in generating each cleaning unit.

For example, it is assumed that 100 cleaning units are included in a cleaning space. As a result of determining the conditions for each cleaning unit, the first to tenth cleaning units may be classified into the complicated area, the eleventh to 20th cleaning units may be classified into the passage area, and the remaining cleaning units may be classified into the normal cleaning area.

Here, when only the first to fifth cleaning units are connected to each other and only the sixth to tenth cleaning units are connected to each other in the first to tenth cleaning units, the processor 190 may generate one cleaning area by combining the first to fifth cleaning units and generate one cleaning area by combining the sixth to tenth cleaning units.

Accordingly, each cleaning area may be classified into one area type, and each cleaning area does not include separate (unconnected) areas.

As a result of the determination in step S1001, if the cleaning area division model is a deep learning based model, the processor 190 classifies the cleaning areas according to the deep learning based model.

Specifically, the processor 190 obtains a map in which a plurality of cleaning areas are distinguished from one another using the deep learning-based cleaning area division model (S1005).

The processor 190 inputs map data for the cleaning space and the cleaning logs for the cleaning space with respect to the deep learning-based cleaning area division model. In addition, a map in which the cleaning space is divided into a plurality of cleaning areas is obtained as an output corresponding to data inputted through the deep learning-based cleaning area division model.

The deep learning-based cleaning area division model will be described with reference to FIG. 12.

FIG. 11 is a view illustrating an example of a rule-based cleaning area division model according to an embodiment of the present invention.

Specifically, FIG. 11 illustrates conditions for information included in cleaning logs in the rule-based cleaning area division model and a result of area type classification according to conditions. It is noted that what is illustrated in FIG. 11 is just an example, and the rule-based cleaning area division model may be implemented through a combination of various conditions.

Hereinafter, a method of classifying an area type for a specific cleaning unit will be described with reference to FIG. 11.

The processor 190 may determine whether a restraint ratio is equal to or greater than a first reference value th1 as the first condition, and classify the cleaning unit into a restrained area if the restraint ratio is greater than or equal to the first reference value in the cleaning area division model.

The restraint ratio may mean a ratio of cleaning logs indicating that a robot cleaner has been restrained in a corresponding cleaning unit with respect to a plurality of collected cleaning logs.

If the restraint ratio is less than the first reference value, the processor 190 may determine whether an obstacle ratio is equal to or greater than a second reference value th2 as a second condition, and classify a corresponding cleaning unit into an obstacle area if the obstacle ratio is equal to or greater than the second reference value.

The obstacle ratio may mean a ratio of cleaning logs indicating that obstacles have been detected in a corresponding cleaning unit among the plurality of collected cleaning logs.

If the obstacle ratio is less than the second reference value, the processor 190 may determine whether an average cleaning time is equal to or greater than a third reference value th3 as a third condition, and if the average cleaning time is greater than or equal to the third reference value, classify the corresponding cleaning unit into the complicated area.

The average cleaning time may mean an average value of required cleaning times for the corresponding cleaning unit, which are obtained from the plurality of collected cleaning logs.

If the average cleaning time is less than the third reference value, the processor 190 may determine whether the average number of times of cleaning is equal to or greater than a fourth reference value th4 as a fourth condition, classify a corresponding cleaning unit into the passage area if the average number of times of cleaning is equal to or greater than the fourth reference value, and classify the corresponding cleaning unit into the normal cleaning area if the average number of times of cleaning is less than the fourth reference value.

The average cleaning time may mean an average value of the number of times of cleaning for the corresponding cleaning unit which are obtained from the plurality of cleaning logs collected.

That is, the cleaning unit in which the artificial intelligence cleaner 100 is frequently constrained is preferentially classified into the restraint area, and the cleaning unit in which an obstacle is frequently recognized is classified into the obstacle area. A cleaning unit in which the artificial intelligence cleaner 100 is not constrained or an obstacle is not frequently recognized but a long time is taken for cleaning is classified into the complicated area. The cleaning unit in which a long time is not taken for cleaning but a large number of times of cleaning are performed is classified into the passage area. A cleaning unit in which a long time is not taken for cleaning but a low number of times of cleaning are performed is classified into the normal cleaning area.

Although the ratio or average is shown in FIG. 11, in another embodiment, a frequency of a cleaning log having specific data among a plurality of cleaning logs may be used. For example, the processor 190 may determine whether the frequency of a cleaning log indicating that restraint occurs in a specific cleaning unit is equal to or greater than a reference value. In other words, the processor 190 may use various statistical values that utilize a plurality of cleaning logs.

Figure 12:
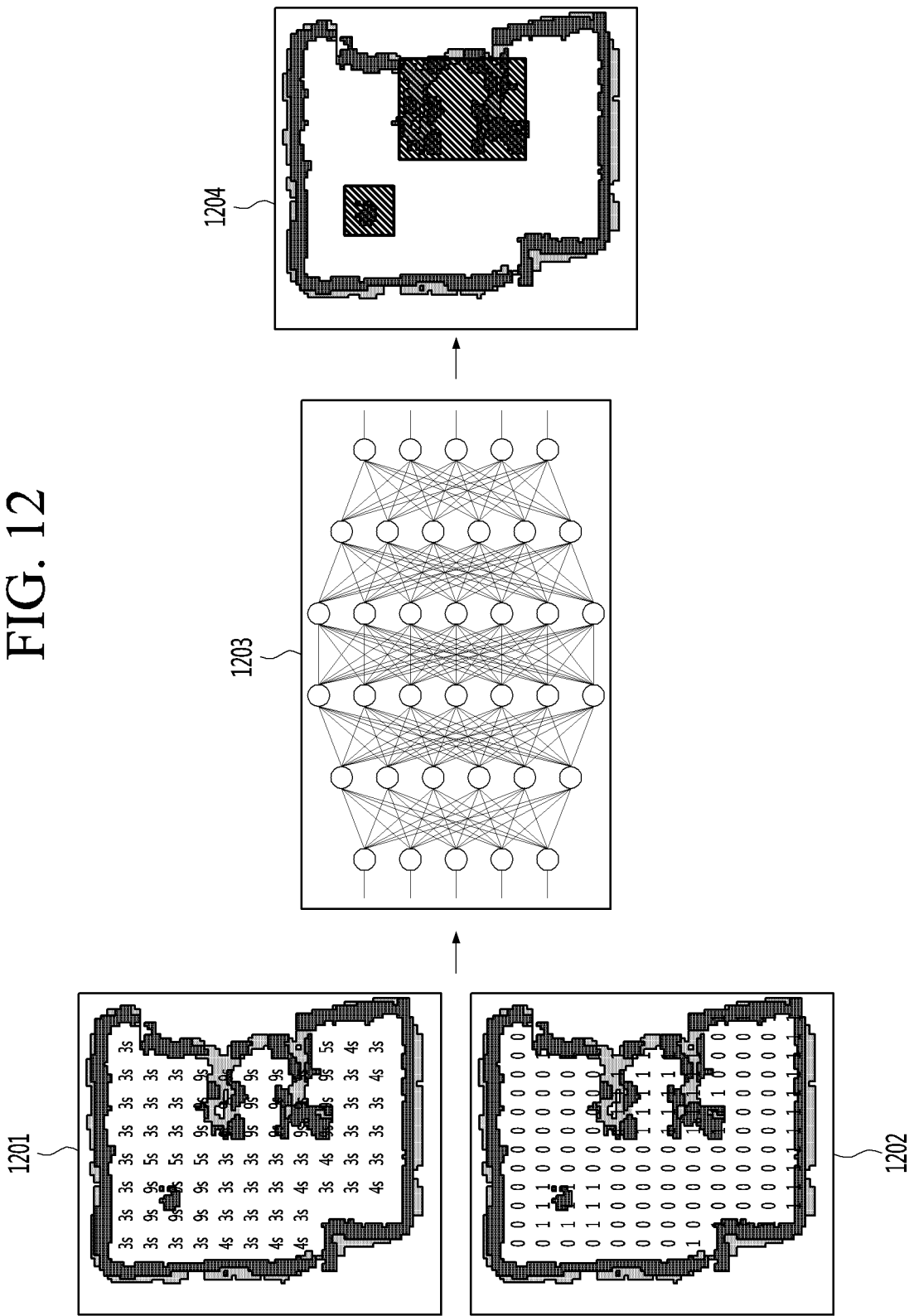
FIG. 12 is a table showing an example of a deep learning-based cleaning area division model according to an embodiment of the present invention.

FIG. 12 is a view illustrating an example of a deep learning-based cleaning area division model according to an embodiment of the present invention.

Referring to FIG. 12, the deep learning based-cleaning area division model 1203 may be configured of an artificial neural network.

The deep learning-based cleaning area division model 1203 may be a personalized model individually learned for each user.

The deep learning-based cleaning area division model 1203 may be a segmentation model.

For example, the deep learning-based cleaning area division model 1203 may be implemented with a model such as a fully convolutional network (FCN), U-net, SegNet, DeepLab, or the like.

The deep learning-based cleaning area division model 1203 is a model for outputting a map in which a plurality of cleaning areas are distinguished from one another when map data corresponding to the cleaning space and cleaning logs 1201 and 1202 in the cleaning space are inputted.

The map corresponding to the cleaning space may be an SLAM map for the cleaning space.

As described above, each of the cleaning logs may include at least one of a required cleaning time, whether cleaning is performed, a cleaning result value, the number of times of cleaning, whether an obstacle is detected or whether restraint occurs, for each cleaning unit in the cleaning space.

Although the map is included in the data itself about the cleaning logs in FIG. 12, the map data and the cleaning logs may be inputted as separate data.

For example, the SLAM map as the map data and the coordinates on the SLAM map and information associated with the coordinates as the data for the cleaning logs may be inputted.

The deep learning-based cleaning area division model 1203 is learned using the training data.

The training data may be composed of training input data and labeling information corresponding to the training input data.

The training input data may include a map corresponding to the cleaning space and cleaning logs in the cleaning space.

The labeling information may be a map in which a plurality of cleaning areas are distinguished from one another, corresponding to the training input data.

Here, the labeling information may be manually set by a user, a developer or a designer.

Here, the labeling information may include an area type.

When the training input data included in the training data is inputted, the deep learning-based cleaning area division model 1203 may be learned such that the difference between output data and the labeling information corresponding to the training input data is decreased. The difference between the output data and the labeling information may be expressed by a loss function or a cost function, and the deep learning-based cleaning area division model 1203 is learned to minimize the loss function.

That is, the deep learning-based cleaning area division model 1203 outputs a map in which the cleaning areas are divided based on the area types, and thus, and the cleaning areas may be classified into one area type.

The deep learning-based cleaning area division model 1203 may be a stored model that is learned through the processor 190 of the artificial intelligence cleaner 100, but may be a model learned through an external learning device 200 and received through the wireless communication unit 140.

In particular, the artificial intelligence cleaner 100 may obtain the user's feedback, generate labeling information corresponding to a corresponding cleaning log based on the user's feedback, and generate the cleaning log and the labeling information as training data. The generated training data may be used to update the deep learning-based cleaning area division model 1203.

The update of the deep learning-based cleaning area division model 1203 may also be performed through the processor 190 of the artificial intelligence cleaner 100, but may also be performed through the external learning device 200.

Figure 13:
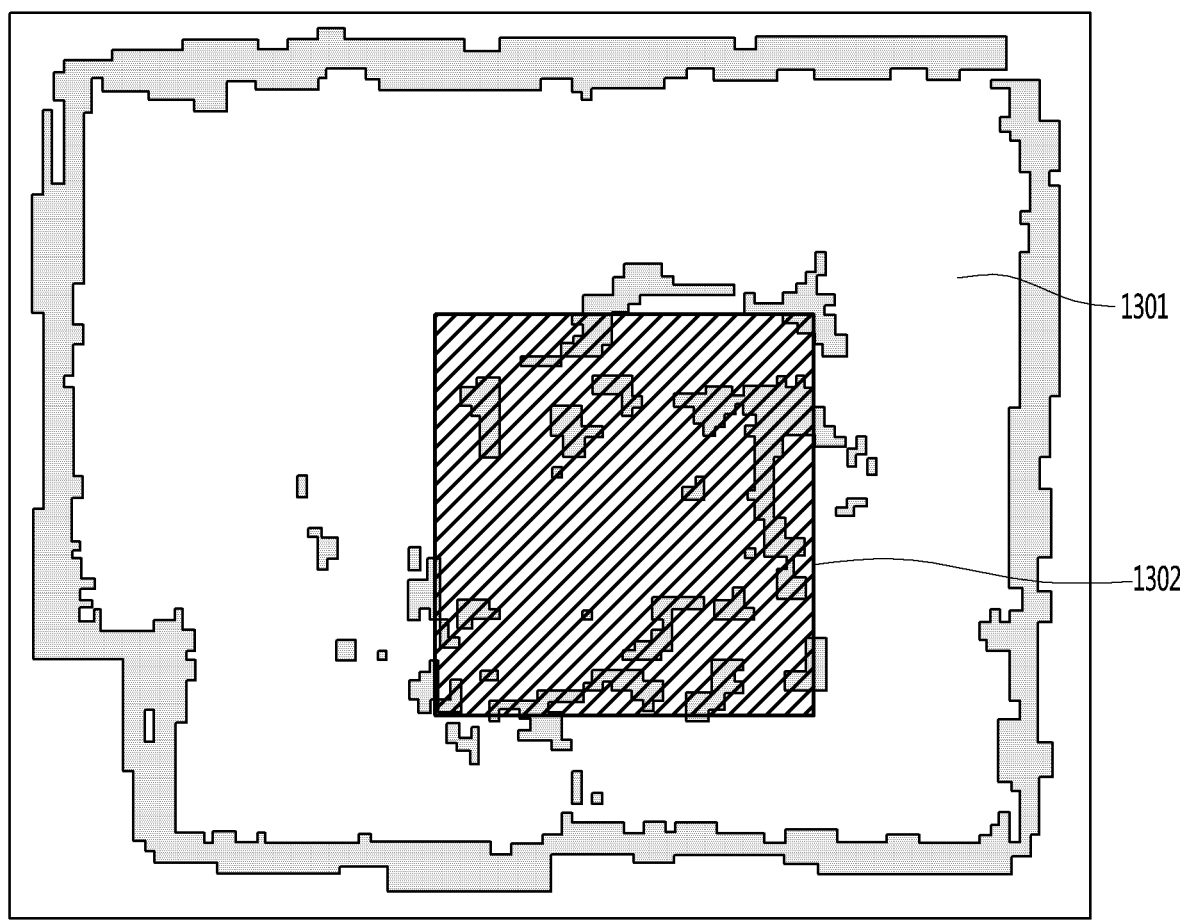
FIGS. 13 to 15 are views illustrating examples of cleaning spaces in which cleaning areas are distinguished from each other, according to an exemplary embodiment.
Figure 14:
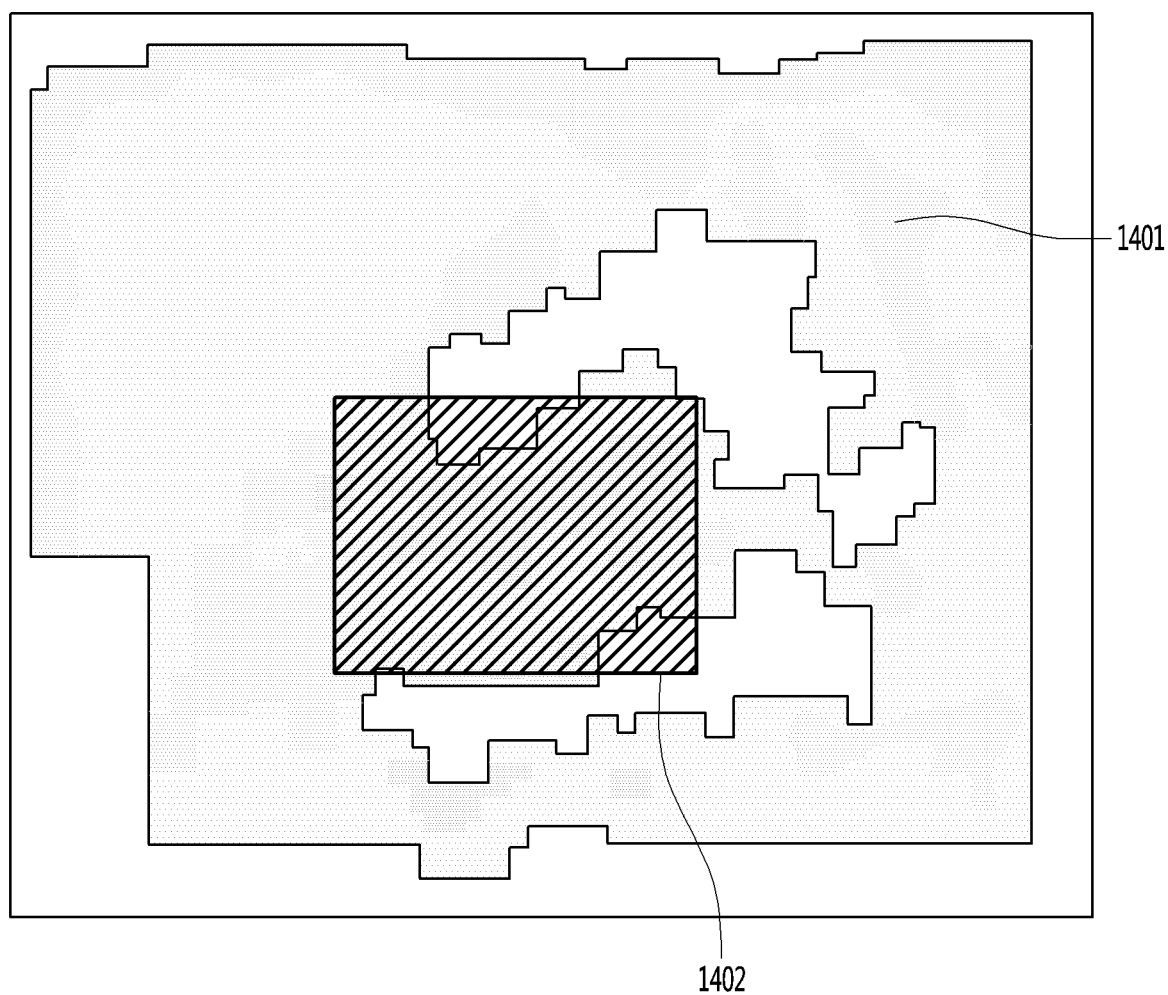
Figure 15:
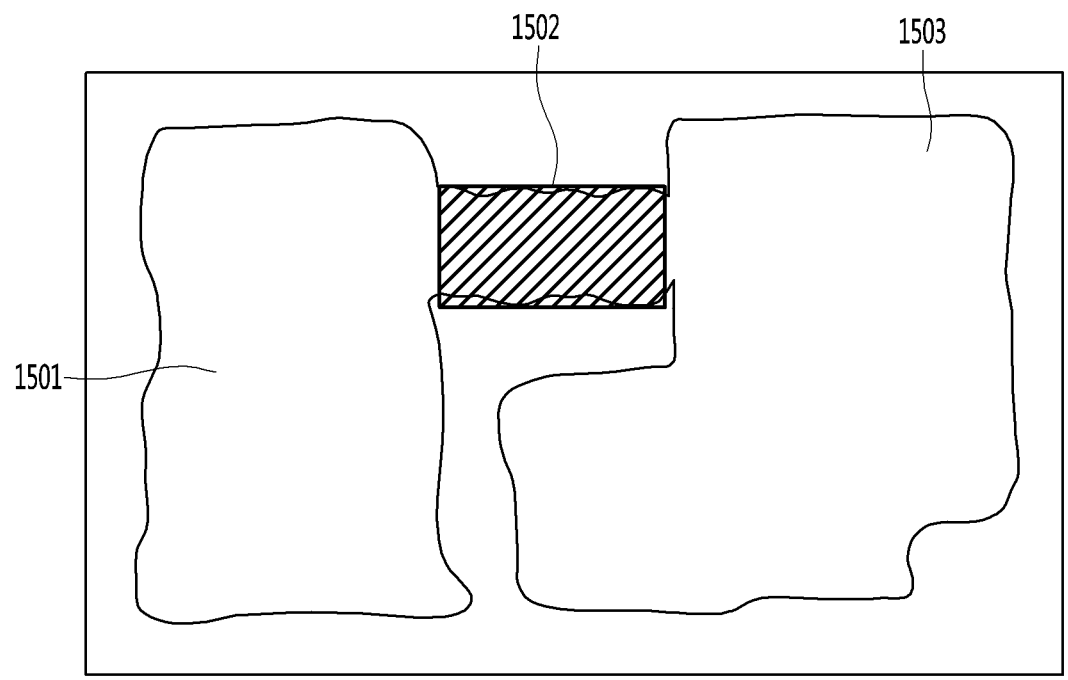

FIGS. 13 to 15 are views illustrating examples of cleaning spaces in which cleaning areas are distinguished from each other, according to an exemplary embodiment.

Specifically, FIG. 13 is a view illustrating an SLAM map in which a cleaning space is divided into a normal cleaning area 1301 and a complicated area 1302.

FIG. 14 is a view illustrating a cleaning space in which is divided into a normal cleaning area 1401 and a complicated area 1402 on a heat map.

FIG. 15 is a view illustrating a cleaning space divided into normal cleaning areas 1501 and 1503 and a passage area 1502.

As shown in FIGS. 13 to 15, a cleaning area in which a long time is taken for cleaning because of a complicated structure due to obstacles or the like may be classified into a complicated area, and a passage connecting several spaces may be classified into a passage area.

Here, an area in which a large number of times of cleaning are performed even though it is not an obstacle area, a restraint area, or a complicated area may be classified into a passage area. That is, the passage area is located in the middle of the several spaces so that the artificial intelligence cleaner 100 repeatedly moves between the spaces, and accordingly, the number of times of cleaning may be high in the passage area.

Figure 16:
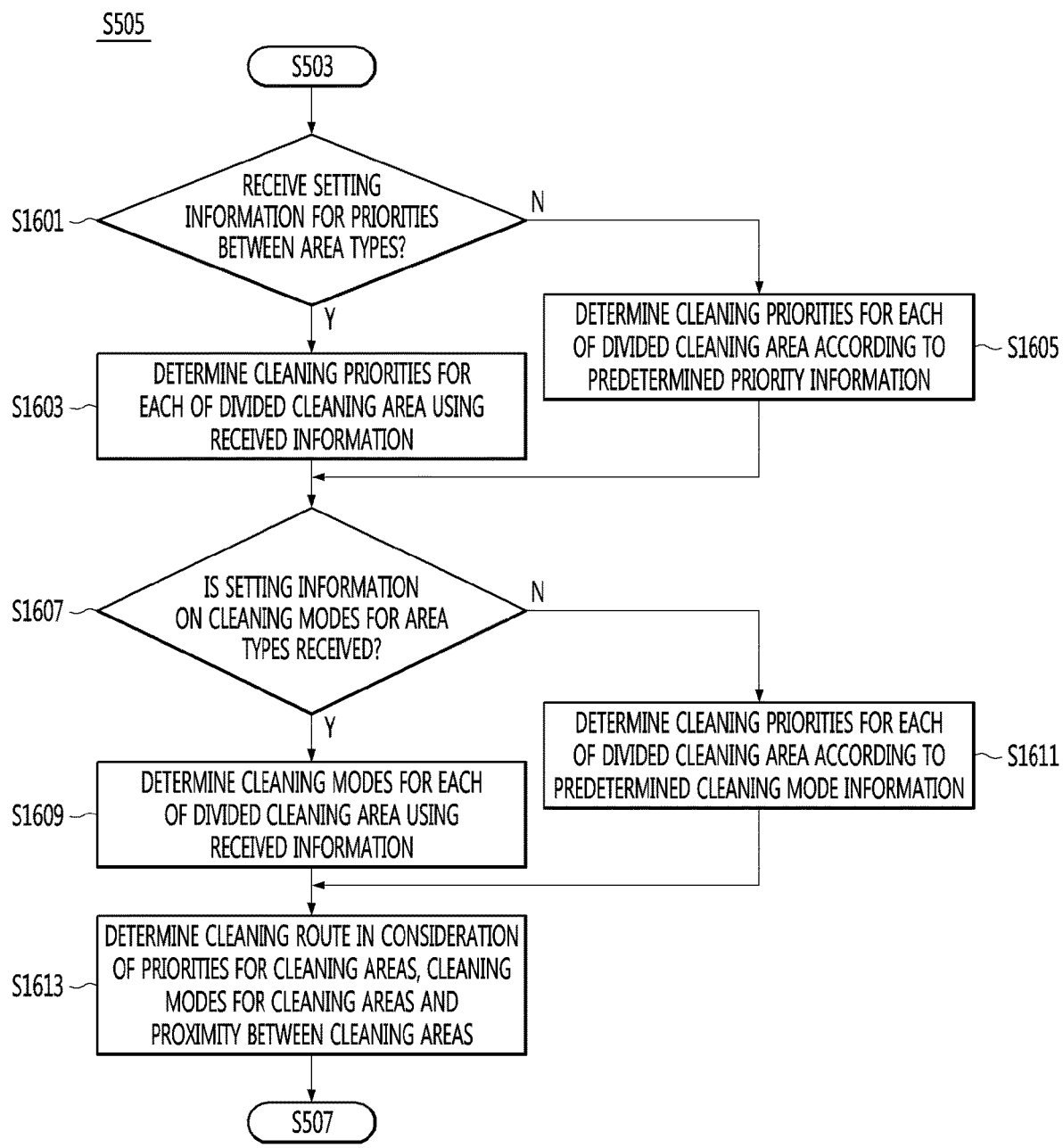
FIG. 16 is a flowchart showing an example of a step (S505) of determining a cleaning route shown in FIG. 5.

FIG. 16 is a flowchart showing an example of a step (S505) of determining a cleaning route shown in FIG. 5.

Referring to FIG. 16, the processor 190 determines whether setting information regarding priorities between area types is received (S1601).

The setting information about the priorities between the area types may be received in the step of determining the cleaning route, but may be received in advance and stored in the memory 150.

That is, step S1601 may mean step of determining whether there is setting information for the priorities between the area types.

As a result of the determination in step S1601, if there is received setting information for the priorities between the area types, the processor 190 determines cleaning priorities for the divided cleaning areas, using the received setting information for the priorities (S1603).

If there is no received setting information on the priorities between the area types received as a result of the determination in step S1601, the processor 190 determines cleaning priorities for the divided cleaning areas, using setting information for predetermined priorities (S1605)

For example, the setting information for the cleaning priorities may be information that sets the normal cleaning area to 1st priority, the passage area to 2nd priority, the complicated area to 3rd priority, the obstacle area to 4th priority, and the restraint area to 5th priority.

As described above, each divided cleaning area is classified into one area type, and thus, the cleaning priorities between divided cleaning areas may be determined using the cleaning priorities between the area types.

The processor 190 determines whether setting information for a cleaning mode for each area type is received (S1607).

The setting information for the cleaning mode for each area type may be received in the step of determining the cleaning route, but may be received in advance and stored in the memory 150.

That is, step S1607 may mean the step of determining whether there is setting information for the cleaning mode for each area type.

As a result of the determination in step S1607, if there is the received setting information for the cleaning mode for each area type received, the processor 190 determines the cleaning mode for each divided cleaning area by using the received setting information for the cleaning mode (S1609).

If there is no received setting information for the cleaning mode for each area type received as a result of the determination in step S1601, the processor 190 determines the cleaning mode for each divided cleaning area by using the setting information for a predetermined cleaning mode. (S1611).

For example, the setting information for the cleaning mode may be information for setting the normal cleaning area to the normal cleaning mode, the passage area and the complicated area to the simple cleaning mode, and the obstacle area and the restraint area to the non-cleaning mode.

The processor 190 determines a cleaning route in consideration of the priority of each cleaning area, the cleaning mode for each cleaning area, and the proximity between the cleaning areas (S1613).

Each cleaning area is classified into one area type, and a plurality of cleaning areas may be classified into the same area type. That is, when different cleaning areas are classified into the same area type, the same cleaning priority and cleaning mode may be set.

Thus, the processor 190 may determine a cleaning route in further consideration of the proximity between the cleaning areas.

For example, assuming that the first to third cleaning areas are adjacent in a line in the order of the first cleaning area, the second cleaning area, and the third cleaning area, and are all classified as the same area type, the processor 190 may determine a cleaning route such that the cleaner moves in the order of the first cleaning area, the second cleaning area and the third cleaning area or in the reverse order.

In addition, the processor 190 may additionally consider the current position of the artificial intelligence cleaner 100 or the position of a charging station of the artificial intelligence cleaner 100 in determining the cleaning route.

In the above example, when the charging station of the artificial intelligence cleaner 100 is located in the third cleaning area, the processor 190 may determine the cleaning route in the order of the third cleaning area, the second cleaning area and the first cleaning area. Similarly, it is noted that the processor 190 may determine the cleaning route in the order of the first cleaning area, the second cleaning area, and the third cleaning area.

Figure 17:
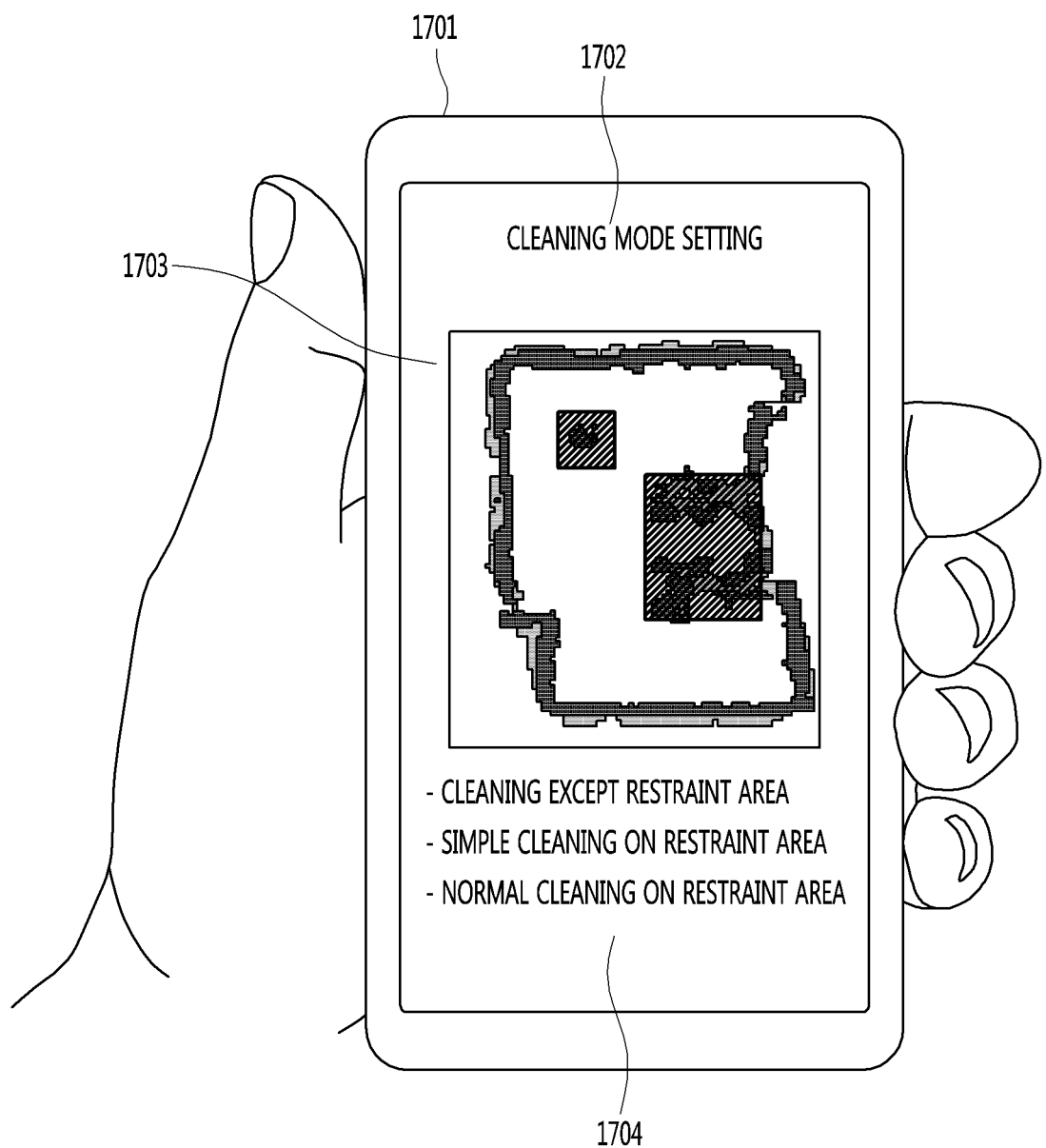
FIGS. 17 and 18 are views illustrating an example of setting a cleaning mode through a user input according to an embodiment of the present invention.
Figure 18:
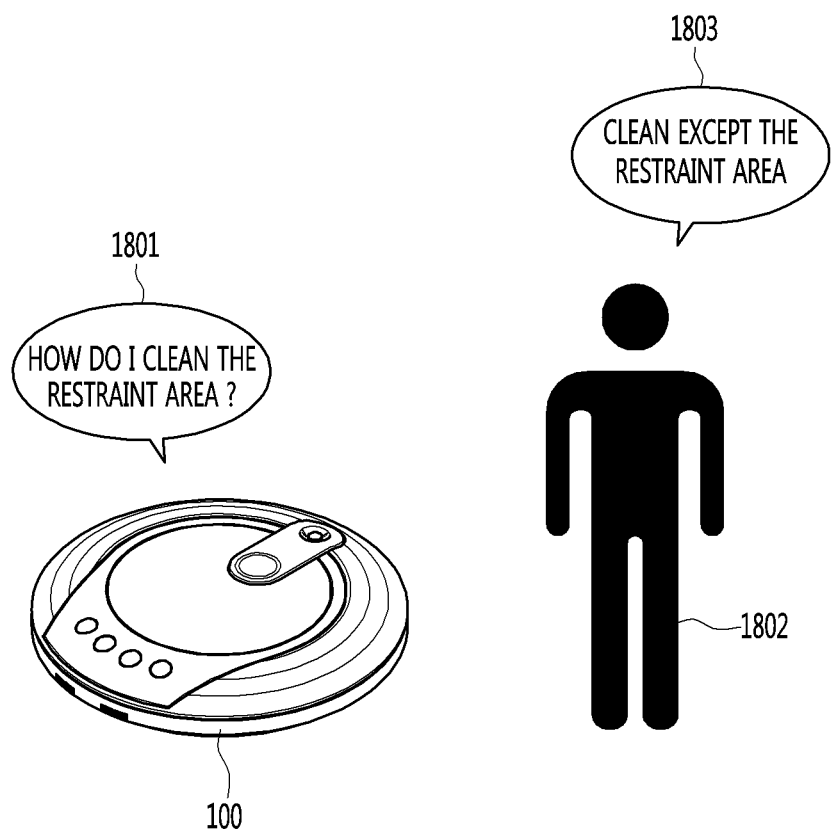

FIGS. 17 and 18 are views illustrating an example of setting a cleaning mode through a user input according to an embodiment of the present invention.

Referring to FIG. 17, the processor 190 may provide a cleaning mode setting window 1702 to a user terminal device 1701 through the wireless communication unit 140. In addition, the processor 190 may receive setting information for the cleaning mode for each area type or a specific area type from the user terminal device 1701 through the wireless communication unit 140.

Here, in the cleaning mode setting window 1702, the cleaning areas divided for a cleaning space are displayed on the SLAM map (1703), and items 1704 for setting a cleaning mode for a specific area type (e.g., a restraint area) may be included.

The cleaning mode setting window 1702 provided to the user terminal device 1701 may be provided as a graphical user interface (GUI).

For example, the items 1704 for setting the cleaning mode may include an item for setting the restraint area to the non-clean mode, an item for setting the restraint area to the simple cleaning mode, and an item for setting the restraint area to the normal cleaning mode.

Referring to FIG. 18, the processor 190 may output a speech 1801 asking a user 1802 about a cleaning mode for each area type or a specific area type through a speaker (not shown) and receive the user's response 1803 for setting a cleaning mode for each area type or a specific area type through a microphone 120.

Figure 19:
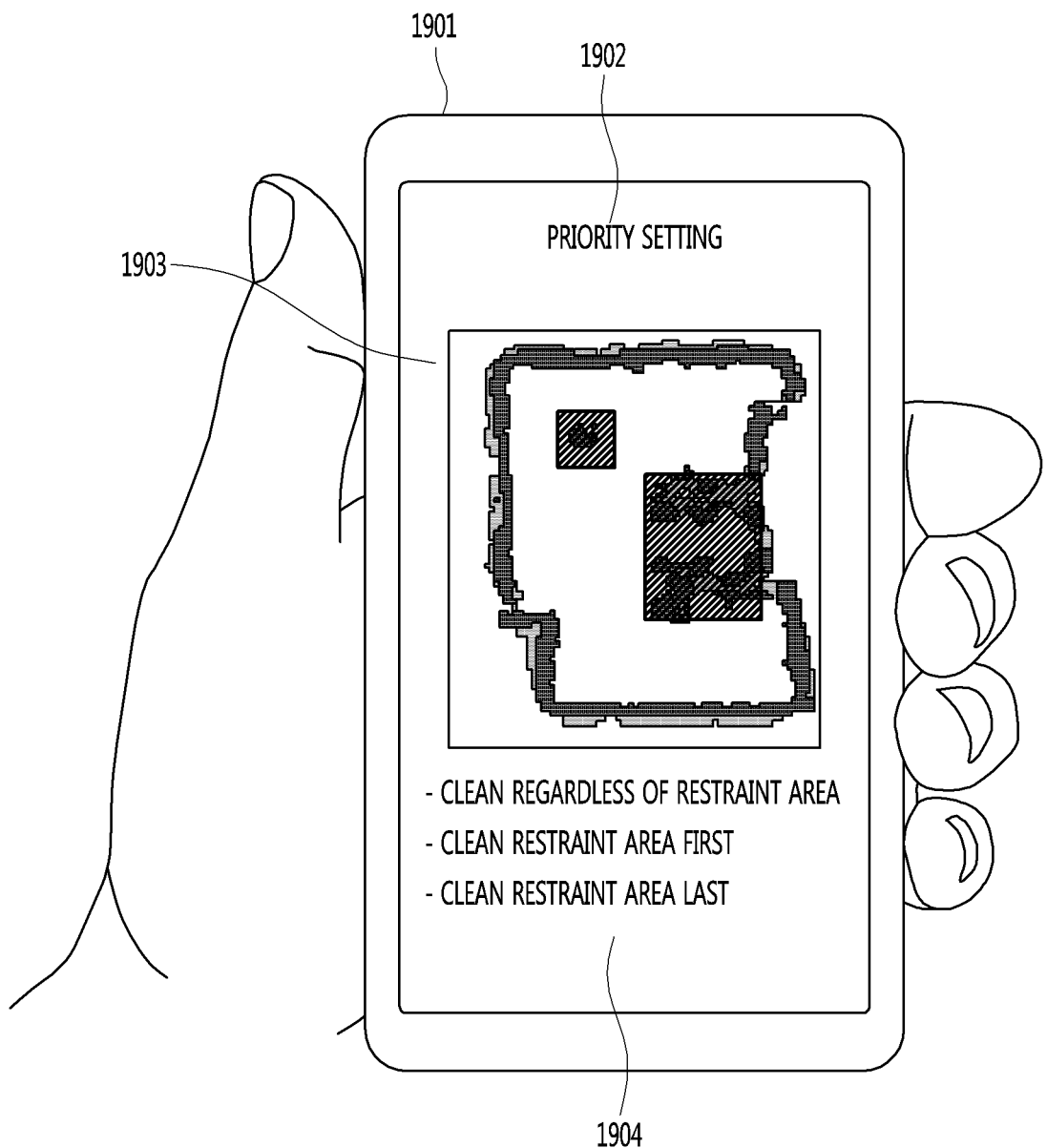
FIG. 19 is a view illustrating an example of setting cleaning priorities through a user's input according to an embodiment of the present invention.

FIG. 19 is a view illustrating an example of setting cleaning priorities through a user's input according to an embodiment of the present invention.

Referring to FIG. 19, the processor 190 may provide a priority setting window 1902 to a user terminal device 1901 through the wireless communication unit 140. In addition, the processor 190 may receive setting information for a cleaning priority for each area type or a specific area type from the user terminal device 1901 through the wireless communication unit 140.

Here, in the priority setting window 1902, the cleaning areas divided for a cleaning space are displayed on the SLAM map (1903), and items 1904 for setting a cleaning priority for a specific area type (e.g., a restraint area) may be included.

The cleaning mode setting window 1902 provided to the user terminal device 1901 may be provided as a graphical user interface (GUI).

For example, items 1904 for setting the cleaning priority include an item for setting to perform cleaning to be performed regardless of the restraint area, an item for assigning the priority of restraint area as the first priority, and an item for assigning the priority of restraint area as the last priority.

Here, the setting to perform cleaning regardless of areas for a specific area type may mean that the priority is not assigned to a corresponding area type. That is, areas that are not assigned priority are not compared with other area types in priority.

Although not separately shown, the processor 190 may output a speech for asking the user about cleaning priority for each area type or a specific area type through a speaker (not shown), and receive the user's response for setting a cleaning priority for the each area type or the specific area type through the microphone 120.

Figure 20:
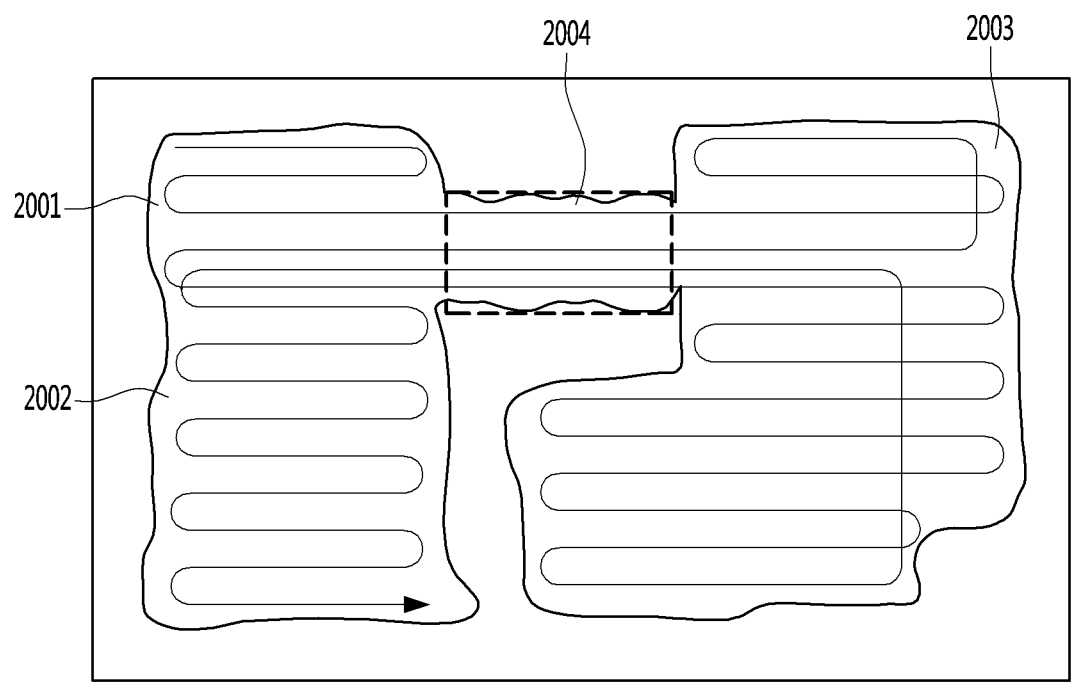
FIGS. 20 and 21 are views illustrating examples of cleaning route of the artificial intelligence cleaner 100 according to an embodiment of the present invention.
Figure 21:
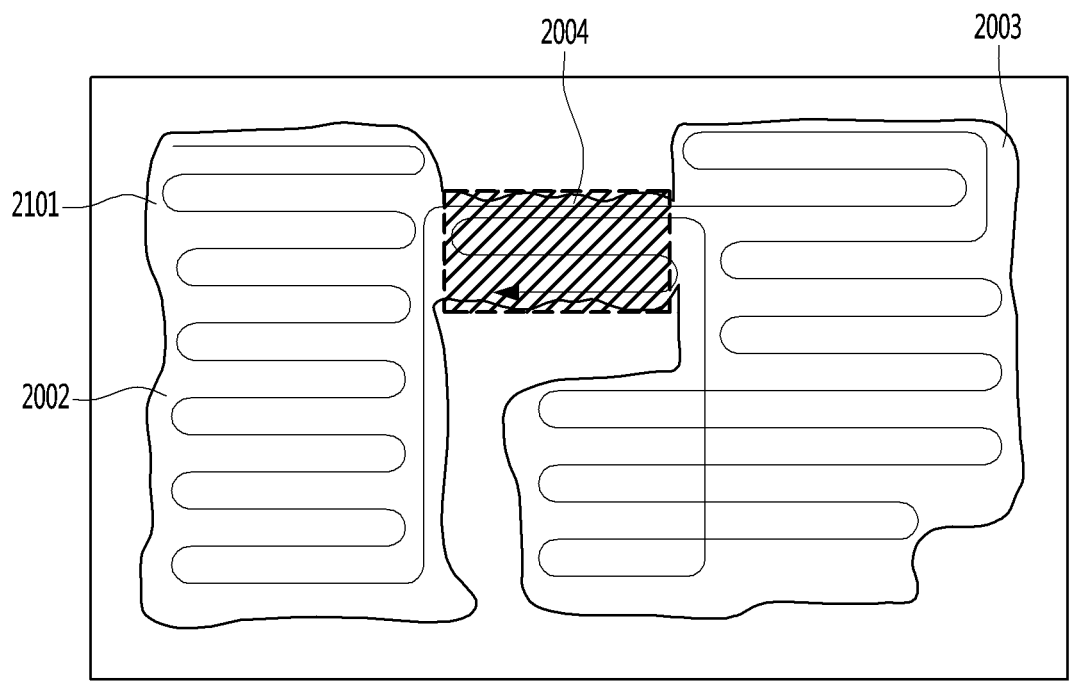

FIGS. 20 and 21 are views illustrating examples of cleaning route of the artificial intelligence cleaner 100 according to an embodiment of the present invention.

The cleaning spaces shown in FIGS. 20 and 21 include two rooms 2002 and 2003 and one passage 2004 located between them.

FIG. 20 shows a cleaning route 2001 in a case in which the cleaning space is not divided into the two rooms 2002 and 2003 and the passage 2004 or a case in which the cleaning priorities between the two rooms 2002 and 2003 and the passage 2004 do not differ from each other.

In this case, the processor 190 does not distinguish between the two rooms 2002 and 2003 and the passage 2004 in determining the cleaning route 2001. Therefore, even when the cleaning is started from the left room 2002, the left room 2002 and the right room 2003 are cleaned non-sequentially while repeatedly passing the passage 2004.

Here, the artificial intelligence cleaner 100 passes through the passage 2004 several times, so that the number of times of cleaning may be unnecessarily increased in the passage 2004. In addition, the cleaning of the right room 2003 and the passage 2004 is performed during the cleaning of the left room 2002, resulting in inefficient cleaning route. In addition, the user may question the reliability of the operation of the cleaner after seeing that cleaning of the left room 2002 is not finished but the cleaner moves to another space.

However, as described above, even though the processor 190 divides the cleaning space into several cleaning areas 2002, 2003, and 2004, when the cleaning areas 2002, 2003, and 2004 have the same cleaning priority or setting is performed not to assign priority, the cleaning route 2001 may be determined as shown in FIG. 20.

FIG. 21 shows a cleaning route 2101 in a case where the cleaning space is divided into the two rooms 2002 and 2003 and the passage 2004, the passage 2004 is classified into a passage area, and the cleaning priority of the passage area is set to be low.

In this case, the processor 190 distinguishes between the two rooms 2002 and 2003 and the passage 2004 in determining the cleaning route 2001. Therefore, in a case the cleaning is started from the left chamber 2002, even though the cleaner is located adjacent to the passage 2004, the cleaner first cleans the left room 2002, moves to the right room 2003 through the passage 2004, cleans the right room 2003, and finally, cleans the passage 2004.

Accordingly, the artificial intelligence cleaner 100 may not pass through the passage 2004 unnecessarily, and may clean the passage 2004 having a lower cleaning priority at a lower priority. In addition, after the cleaning of the left room 2002 is finished, the cleaning of the right room 2003 and the passage 2004 is performed sequentially, thereby leading to the efficient cleaning route.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence cleaner comprising:
   a memory configured to store a simultaneous localization and mapping (SLAM) map for a cleaning space;
   a driving unit configured to drive the artificial intelligence cleaner; and
   a processor configured to:
      collect a plurality of cleaning logs for the cleaning space,
      divide the cleaning space into a plurality of cleaning areas using the SLAM map and the collected plurality of cleaning logs,
      determine a cleaning route of the artificial intelligence cleaner in consideration of the divided cleaning areas,
      control the driving unit according to the determined cleaning route,
   wherein the processor is further configured to:
      input map data corresponding to the cleaning space and the cleaning logs to an area division model learned by using a machine learning algorithm or a deep learning algorithm,
      obtain map data in which the cleaning space is divided into the plurality of cleaning areas, and
      obtain division information for the plurality of cleaning areas using the obtained map data,
      wherein the learned area division model includes an artificial neural network.

2. The artificial intelligence cleaner of claim 1, wherein the divided plurality of cleaning areas are classified into one of a plurality of predetermined area types and include no sub cleaning areas which are not connected to one another.

3. The artificial intelligence cleaner of claim 2, wherein the plurality of area types include a basic cleaning area and at least one of an obstacle area, a restraint area, a complicated area, or a passage area.

4. The artificial intelligence cleaner of claim 3, wherein the processor is configured to determine the cleaning route such that the artificial intelligence cleaner preferentially cleans a first cleaning area which is classified into the basic cleaning area and subsequently cleans a second cleaning area which is not classified into the basic cleaning area.

5. The artificial intelligence cleaner of claim 2, wherein the processor is configured to:
   set cleaning modes for the area types respectively, and
   control the driving unit according to the set cleaning mode,
   wherein the cleaning modes include at least a normal cleaning mode, a simple cleaning mode and a non-cleaning mode.

6. The artificial intelligence cleaner of claim 5, wherein the processor is configured to:
   determine priorities between the area types, and
   determine the cleaning route in consideration of the determined priorities, the set cleaning mode, and proximity between the divided cleaning areas.

7. The artificial intelligence cleaner of claim 6, further comprising:
   a communication unit configured to communicate with a user terminal device,
   wherein the processor is configured to provide, via the communication unit, information on the divided cleaning areas to the user terminal device.

8. The artificial intelligence cleaner of claim 7, wherein the processor is configured to, when receiving cleaning mode setting information on the cleaning modes for the area types from the user terminal device via the communication unit, set cleaning modes for the area types respectively according to the received cleaning mode setting information and control the driving unit according to the set cleaning mode.

9. The artificial intelligence cleaner of claim 7, wherein the processor is configured to, when receiving priority setting information on the priorities from the user terminal device via the communication unit, set the priorities between the area types according to the received priority setting information and determine the cleaning route according to the set priorities.

10. The artificial intelligence cleaner of claim 2, wherein the plurality of cleaning logs include at least one of a required cleaning time, whether cleaning is performed, a cleaning result value, a number of times of cleaning, whether an obstacle is detected, or whether restraint occurs, with respect to each cleaning unit in the cleaning space.

11. The artificial intelligence cleaner of claim 10, wherein the processor is configured to classify each of the cleaning areas into one of the predetermined area types using a preset condition related to at least one of the required cleaning time, whether cleaning is performed, the cleaning result value, the number of times of cleaning, whether an obstacle is detected, or whether restraint occurs, when dividing the cleaning space into the plurality of cleaning areas.

12. A method of operating an artificial intelligence cleaner, the method comprising:
   collecting a plurality of cleaning logs for a cleaning space;
   dividing the cleaning space into a plurality of cleaning areas using a simultaneous localization and mapping (SLAM) map of the cleaning space and the collected plurality of cleaning logs;
   determining a cleaning route of the artificial intelligence cleaner in consideration of the divided cleaning areas; and
   controlling a driving unit for driving the artificial intelligence cleaner according to the determined cleaning route,
   wherein the method further comprises:
      inputting map data corresponding to the cleaning space and the cleaning logs to an area division model learned by using a machine learning algorithm or a deep learning algorithm,
      obtaining map data in which the cleaning space is divided into the plurality of cleaning areas, and
      obtaining division information for the plurality of cleaning areas using the obtained map data,
      wherein the learned area division model includes an artificial neural network.

13. A non-transitory recording medium having a program recorded thereon for a method of operating an artificial intelligence cleaner, wherein the method comprises:
   collecting a plurality of cleaning logs for a cleaning space;

dividing the cleaning space into a plurality of cleaning areas using a simultaneous localization and mapping (SLAM) map of the cleaning space and the collected plurality of cleaning logs;

determining a cleaning route of the artificial intelligence cleaner in consideration of the divided cleaning areas; and controlling a driving unit for driving the artificial intelligence cleaner according to the determined cleaning route, wherein the method further comprises:
  inputting map data corresponding to the cleaning space and the cleaning logs to an area division model learned by using a machine learning algorithm or a deep learning algorithm,
  obtaining map data in which the cleaning space is divided into the plurality of cleaning areas, and
  obtaining division information for the plurality of cleaning areas using the obtained map data,
  wherein the learned area division model includes an artificial neural network.

* * * * *